United States Patent [19]
Nojima et al.

[11] Patent Number: 5,644,199
[45] Date of Patent: Jul. 1, 1997

[54] METHOD FOR DRIVING AN ULTRASONIC MOTOR

[75] Inventors: Takashi Nojima, Katano; Masanori Sumihara, Higashi-osaka; Tetsuro Otsuchi, Osaka; Takahiro Nishikura, Ikoma; Osamu Kawasaki, Kyoto; Katsu Takeda, Osaka; Katsumi Imada, Katano, all of Japan

[73] Assignee: Matsushita Electric Industrial Co., Ltd., Kadoma, Japan

[21] Appl. No.: 503,512

[22] Filed: Jul. 18, 1995

[30] Foreign Application Priority Data

| Jul. 20, 1994 | [JP] | Japan | 6-168117 |
| Jul. 20, 1994 | [JP] | Japan | 6-168120 |
| Jul. 28, 1994 | [JP] | Japan | 6-176849 |

[51] Int. Cl.⁶ ................................. H02K 33/00
[52] U.S. Cl. .................. 318/114; 318/127; 310/314; 310/311
[58] Field of Search .................. 318/114, 116, 318/117, 118, 119, 123, 126, 127; 310/317, 318, 319, 321, 314, 316, 323, 311

[56] References Cited

U.S. PATENT DOCUMENTS

| 4,727,276 | 2/1988 | Izukawa et al. | 310/316 |
| 4,794,294 | 12/1988 | Shimizu et al. | 310/316 |
| 4,853,579 | 8/1989 | Kawasaki et al. | 310/116 |
| 4,914,337 | 4/1990 | Takagi | 310/316 |
| 4,926,084 | 5/1990 | Furutsu et al. | 310/316 |
| 5,001,404 | 3/1991 | Kataoka | 318/116 |
| 5,013,982 | 5/1991 | Sasaki | 318/114 |
| 5,032,753 | 7/1991 | Yamaguchi et al. | 310/317 |
| 5,062,622 | 11/1991 | Kataoka et al. | 271/270 |
| 5,130,619 | 7/1992 | Izuno | 318/116 |
| 5,159,253 | 10/1992 | Shimizu et al. | 319/606 |
| 5,198,714 | 3/1993 | Salomon et al. | 310/323 |
| 5,233,274 | 8/1993 | Honda et al. | 318/116 |
| 5,461,273 | 10/1995 | Kawasaki et al. | 310/316 |

FOREIGN PATENT DOCUMENTS

| 0602635 | 6/1994 | European Pat. Off. |
| 236777 | 2/1990 | Japan |
| 2101975 | 4/1990 | Japan |
| 3239168 | 10/1991 | Japan |
| 479777 | 3/1992 | Japan |
| 4222476 | 8/1992 | Japan |
| 5095685 | 4/1993 | Japan |
| 6189566 | 7/1994 | Japan |
| 9108594 | 6/1991 | WIPO |

OTHER PUBLICATIONS

Aoyagi et al, "Development of Fast and Fine Position Control System of an Ultrasonic Motor", Jap. Journal of Applied Physics, Proc. 12th Symp. on Ultrasonic Electronics, 31 (1992) Suppl. 31-1, Yokohama, Japan, pp. 254-256.

*Primary Examiner*—John W. Cabeca
*Attorney, Agent, or Firm*—Renner, Otto, Boisselle, Sklar

[57] ABSTRACT

The present invention relates to a method for driving an ultrasonic motor of the type which includes a vibrator for causing a flexural vibration wave in response to a pair of AC driving voltage signals, and a rotor in contact with the vibrator and moved by the flexural vibration wave. The rotational speed of the ultrasonic motor is controlled by using a feedback signal and a data table, the feedback signal indicating the current rotational speed of the ultrasonic motor, and the data table storing values of the feedback signal as a standard function of the rotational 21 speed. The method includes the step of sampling the feedback signal and detecting the rotational speed in a plurality of rotation states of the ultrasonic motor. The method obtains an approximate function representing the relationship between the sampled feedback signal and the detected rotational speed of the ultrasonic motor, and calculates correction coefficients for adjusting the approximate function to the standard function. The method then controls the rotational speed of the ultrasonic motor by using the feedback signal. In the controlling step, the method corrects the feedback signal obtained from the ultrasonic motor by using the correction coefficient, whereby a value of the approximate function is transformed into a corresponding value of the standard function.

13 Claims, 17 Drawing Sheets

P1>P2>P3: Power supply
×: Driving limit

METHOD FOR DRIVING AN ULTRASONIC MOTOR

BACKGROUND OF THE INVENTION

1. Field of the Invention

The present invention relates to an ultrasonic motor, and more particularly, to a method for controlling the rotation speed of an ultrasonic motor which is driven by elastic vibration caused by the piezoelectric effect of a piezoelectric member.

2. Description of the Related Art

In recent years, ultrasonic motors have been received much attention. An ultrasonic motor has a vibrator comprising a piezoelectric member formed of piezoelectric ceramic or the like for converting electric energy into mechanical energy, and an elastic substrate such as a metal substrate. The ultrasonic motor is driven by elastic vibration of the vibrator which is caused by applying an AC voltage to the vibrator.

Referring to the figures, a conventional disc-type ultrasonic motor using a traveling wave of the vibrator will be now described. FIG. 16 is a cross-sectional view of a conventional ultrasonic motor 700. The ultrasonic motor 700 includes a vibrator 3 and a rotor 6. The vibrator 3 includes a disc-shaped elastic substrate 1 formed of an elastic material such as metal or ceramic, and a disc-shaped piezoelectric body 2 formed of ceramic provided on one of two main surfaces of the elastic substrate 1. On the other main surface of the elastic substrate 1, projection 1A is provided for enlarging the displacement in a circumferential direction of the vibrator caused by the vibration. The rotor 6 includes an elastic body 4 formed, for example, of metal or plastic and a friction body 5 formed of an anti-abrasion material. The friction body 5 enhances the resistance against abrasion and ensures stable contact between the rotor 6 and the projection 1A.

The vibration of the vibrator 3 is converted into a rotation of the rotor 6 so as to be transmitted through a transmission axis 7. The transmission axis 7 includes a protruding portion 7A for efficiently and stably transmitting rotational force of the rotor 6 to the transmission axis 7, and an output transmission portion 7B for outputting the rotational force. An elastic member 8 having a large frictional constant is provided on the protruding portion 7A. The elastic member 8 absorbs and compensates abnormal vibrations of the transmission axis 7 so that the rotational force of the rotor 6 is efficiently and stably transmitted.

The vibrator 3 is supported by a supporting member 9 provided on a base 13. The supporting member 9 holds the vibrator 3 without obstructing the vibration thereof. A bearing 10 is provided at the base 10 for positioning the transmission axis 7. The rotor 6 is placed on the vibrator 3 on the side of the friction body 5 and is pressed against the vibrator 3 as a result of a pressure applied by a pressing member 11 such as a spring or the like. The pressure is controlled by a pressing adjuster 12.

FIG. 17 shows an exemplary structure of driving electrodes provided on the piezoelectric body 2. Four flexural vibration travelling waves are excited in the vibrator 3 by virtue of the driving electrodes. In FIG. 17, $A_0$ and $B_0$ denote two sets of driving electrodes each of which consists of divided portions each corresponding to ½ of a wavelength of a travelling wave exited on the vibrator 3. $C_0$ denotes a region corresponding to ¼ the wavelength of the travelling wave in the vibrator 3. $D_0$ denotes an electrode corresponding to ¾ wavelength of the travelling wave in the vibrator 3. Accordingly, the sets $A_0$ and $B_0$ of driving electrodes are positionally shifted from each other in a circumferential direction by ¼ of a wavelength (i.e. 90°) of the travelling wave excited in the vibrator 3.

In the electrode sets $A_0$ and $B_0$, two adjacent portions are alternately polarized in opposite directions along a thickness-direction of the electrodes. The piezoelectric body 2 comes into contact with the elastic substrate 1 by an opposite side of that shown in FIG. 17. The opposite side has driving electrodes which are not divided.

When the two sets of the electrodes $A_0$ and $B_0$ are used, each divided portions are short-circuited as indicated by a shade in FIG. 17. When the two sets of electrodes $A_0$ and $B_0$ are respectively supplied with AC voltages $V_1$ and $V_2$ having a 90° phase difference from each other as expressed by Equations (1) and (2), a flexural vibration travelling wave as expressed by Equation (3) is excited in the vibrator 3.

$$V_1 = V_0 \times \sin(\omega t) \quad (1)$$

$$V_2 = V_0 \times \cos(\omega t) \quad (2)$$

$$\xi = \xi_0 \times \{\cos(\omega t) \times \cos(kx) + \sin(\omega t) \times \sin(kx)\} = \xi_0 \times \cos(\omega t - kx) \quad (3)$$

where $V_0$: the maximum amplitude of applied voltage; $\omega$: angular frequency; t: time; $\xi$: amplitude of the flexural vibration; $\xi_0$: the maximum amplitude of the flexural vibration; k: the wave number ($=2\pi/\lambda$); and x: the position of the coordinate in the travelling direction of the waves.

From Equation (3), the travelling direction of the wave can be switched simply by changing the phase difference between the voltages $V_1$ and $V_2$ to +90 or −90. Thus, the rotation direction of the rotor 6 can easily be changed.

FIG. 18 is a schematic view for describing the operation principles behind the ultrasonic motor 700. A driving force is transmitted from the vibrator 3 to the rotor by way of the friction body 5. The interface between the vibrator 3 and the rotor shown in FIG. 18 is described by using a simplified linear model, although in practice it has a more complicated shape as will be appreciated.

When the flexural vibration travelling wave is excited on the vibrator 3, the given points on the surface of the vibrator 3 move along an ellipse having the line of apsides (long axis) w with a minor axis (short axis) u as in shown in FIG. 18. The rotor 6 contacts the vibrator 3 at the apsis of the ellipse (for example, point A) via the friction body 5. The rotor 6 contacts the vibrator 3 only at the crests of the flexural vibration travelling wave, and receives a horizontal displacement component of the vibrator 3 by the resultant friction, thereby moving in an opposite direction relative to the travelling direction of the flexural traveling wave at a moving velocity v expressed by Equation (4).

$$v = \omega \times w \quad (6)$$

Since the crests of the wave are continuously moving, the contact points A of the vibrator 3 and the rotor 6 also move continuously with time. Thus, the rotor 6 is smoothly driven to rotate. The rotation direction of the rotor 6 can easily be changed by changing the travelling direction of the flexural traveling wave as mentioned above.

FIG. 19 shows an equivalent circuit 710 of the rotor 3 of the ultrasonic motor 700. The equivalent circuit 710 is expressed by a capacitance 14 (electric capacitance $C_e$), a transformer 15 (transforming coefficient N) for transforming electric energy to mechanical energy, a capacitance 16

(mechanical elastic constant $C_m$), a coil 17 (mass $L_m$), and a resistance 18 (mechanical loss $R_m$).

When a voltage V is applied to the piezoelectric member 2, a total current 19 (i) flows into the piezoelectric member 2 based on the frequency and magnitude of the amplitude of the voltage V. The total current 19 is divided into an electric branch current 20 ($i_e$) flowing into the capacitance 14 and a mechanical branch current 21 ($i_m$) flowing into the transformer 15. The mechanical branch current 21 is converted linearly by the transformer 15 into a displacement velocity $v_d$ of the vibrator 3 in a circumferential direction. The displacement velocity $v_d$ in the circumferential direction is expressed by Equation (5):

$$v_d = d\xi'/dt \tag{5}$$

where, $\xi'$ denotes a displacement of the vibrator 3 in the circumferential direction. Accordingly, by detecting the total current 19 or the mechanical branch current 21, the displacement $\xi'$ of the vibrator 3 in a circumferential direction is obtained by using an appropriate proportional constant.

As mentioned above, the rotational speed (moving velocity) v of the rotor 6 is proportional to an instant value of the amplitude of the flexural vibration of the vibrator 3, and the instant value of the amplitude of the flexural vibration (the displacement velocity) is proportional to the mechanical branch current 21 of the piezoelectric member 2 included in the vibrator 3. Accordingly, information of the rotational speed of the ultrasonic motor 700 can be obtained by detecting the mechanical branch current 21 flowing in the piezoelectric member 2.

FIG. 20 is a block diagram of a conventional driving circuit 720 for driving and controlling the speed of the ultrasonic motor 700.

A voltage-controlled oscillator 22 generates an AC signal 721 for driving the ultrasonic motor 700. The AC signal 721 from the voltage-controlled oscillator 22 is divided into two signals. One signal is shifted in phase by a predetermined amount (by +90° or −90°) by a phase shifter 23 and a resultant phase shifted signal 722 is input to a power amplifier 24. The power amplifier 24 amplifies the signal 722 to a level which is sufficiently high to drive the ultrasonic motor 700 based on supply power supplied from a direct current (DC) power supply 25. The other signal is directly input from the voltage-controlled oscillator 22 to another power amplifier 26. The power amplifier 26 amplifies the signal to a level which is sufficiently high to drive the ultrasonic motor 700 based on power supply supplied from the DC power supply 25. Then, the waveform of the amplified signal 723 from the power amplifier 24 is shaped by a coil 27, and then the shaped signal 724 is input to one driving electrode set 28 on the piezoelectric member 2 (not shown in FIG. 20). The signal 724 is also coupled to a capacitor 29 which has an equivalent capacitance of the piezoelectric member 2 under the electrode set 28. Similarly, the waveform of the amplified signal 725 from the power amplifier 26 is shaped by a coil 30, and then the shaped signal 726 is coupled to the other driving electrode set 31 on the piezoelectric member 2. The signal 726 is also coupled to a capacitor 32 which has an equivalent capacitance of the piezoelectric member 2 under the electrode set 31.

By applying the pair of the signals 724 and 726 to the electrode sets 28 and 31, respectively, a traveling wave of a flexural vibration is excited on the vibrator 3. The rotor 6 is rotated in the opposite direction of the flexural traveling wave, as mentioned above, so that the ultrasonic motor 700 is driven. In the piezoelectric member 2, a total current i flows, which depends on the frequency and the magnitude of a voltage signal applied to the piezoelectric member 2 according to the signals 724 and 726. The total current i is linearly converted into a voltage signal 727 by a resistance 33 coupled to ground. The voltage signal 727 is then applied to an input of a subtracter 34.

Electric currents $i_e'$ equivalent to the electric branch current $i_e$ which flows in the electrode sets 28 and 31 depending on the frequency and the absolute value of the amplitude of the voltage signal applied to the piezoelectric member 2, are input to capacitors 29 and 32. These currents are applied together to a resistance 35 so as to be converted linearly into a voltage signal 728. The signal 728 is applied to another input of the subtracter 34. The output of the subtracter 34 is a voltage signal 729 which is proportional to the mechanical branch current $e_m$ and also proportional to the rotational speed of the rotor 6, as discussed above.

The output signal 729 of the subtracter 34 is converted into a DC voltage signal 730 by a rectifier 36, and is input to a microcomputer 37. The microcomputer 37 compares a value of the DC voltage signal 730 with data stored in the memory 38 so as to identify a current rotational speed of the ultrasonic motor 700. The data stored in the memory 38 is a predetermined (average) relationship between a rotational speed signal and a corresponding rotational speed. The microcomputer 37 then compares the current rotational speed with a target speed signal 732 given by a speed setting unit 39 so as to output a control signal 733 to the voltage-controlled oscillator 22. The frequency of the driving signal 721 is controlled so as to adjust the current rotational speed of the ultrasonic motor 700 to the target speed 732.

As a conventional ultrasonic motor, a disk-shape ultrasonic motor 700 using a traveling wave is described above. There is another type of ultrasonic motor having a ring-shape and which uses flexural vibration travelling waves having vibration modes of first or greater order in a radial direction and third or greater order in a circumferential direction. The ring-shaped ultrasonic motor operates by a similar principle and is driven by a similar driving circuit as mentioned above. A conventional standing wave ultrasonic motor in which the rotor is loaded by a vibration piece to rotate, also uses a similar driving system.

The conventional circuits for driving and controlling an ultrasonic motor such as the above-described driving circuit 720 have the following problems:

The relationship between a rotational speed signal for indicating a rotational speed and an actual rotational speed of the ultrasonic motor may vary among individual ultrasonic motors, due to variations in material constants such as in connection with piezoelectric ceramic and metal used for the vibrator 3 and the rotor 6, as well as due to tolerance variations in connection with assembling the vibrator 3 and the rotor 6. Such variations in the relationship between the indicated rotational speed and the actual rotational speed among the ultrasonic motors will detrimentally affect accurate control of the rotational speed and stable rotation of the ultrasonic motor 700.

Furthermore, in order to reduce driving power consumption, a voltage level of the DC power supply 25 is set at a minimum voltage which is capable of driving the ultrasonic motor 700 at a maximum rotational speed determined by the specification under a standard load. The driving range of the ultrasonic motor 700 is limited by the predetermined voltage level of the DC power supply 25 which supplies power to the power amplifiers 24 and 26. When the load on the ultrasonic motor 700 increases, a frequency of the driving signal will be reduced in order to obtain more power for driving the ultrasonic motor 700.

Nevertheless, the driving frequency of the ultrasonic motor 700 cannot be shifted in order to increase the rotational power beyond the driving range which is limited by the voltage level of the DC power supply 25.

In a case where the voltage level of the DC power supply 25 is increased in order to increase the available driving power, the driving of the ultrasonic motor 700 is predominantly controlled by the driving voltage rather than the frequency of the driving signal. This makes it difficult to set the vibrator 3 to a low impedance state by shifting the frequency of the driving signal. Accordingly, the mechanical branch current does not flow efficiently, resulting in an increase in power consumption of the ultrasonic motor 700 under the standard load.

As shown in FIG. 21, a characteristic curve illustrating the relationship between the rotational speed and the driving frequency of the ultrasonic motor 700 exhibits hysteresis with respect to a sweeping direction of the driving frequency.

FIG. 22 shows the admittance characteristics of the vibrator 3 in a driving state as indicated by a curve 80, and in a stationary state (or when the ultrasonic motor 700 is stopped) as indicated by a curve 81. A resonance frequency of the vibrator 3 in the stationary state is higher than a driving frequency range of the vibrator 3 in the driving state. A changing ratio of the admittance curve 81 is very high (i.e. unstable) at frequencies lower than the resonance frequency. In addition, a frequency range which is capable of being driven is very narrow in the stationary state. Accordingly, in order to start driving the ultrasonic motor 700 stably and to drive it efficiently, it is required to sweep the driving frequency from a frequency sufficiently higher than the resonance frequency of the vibrator 3, when the ultrasonic motor 700 is started driving. Nevertheless, the conventional driving circuit 720 does not always start driving by sweeping the driving frequency from the higher side of the resonance frequency. Therefore, the conventional driving circuit 720 cannot start driving the ultrasonic motor 700 and drive it efficiently.

In the driving circuit 720 (FIG. 20), the rotating ultrasonic motor 700 is stopped by cutting off the supply of the driving signal 721, so that the vibrator 3 immediately comes to stop. However, the rotor 6 cannot stop immediately because of inertia of the rotor 6 itself, the transmission axis 7, an external load, and the like. Accordingly, a slip between the vibrator 3 and the rotor 9 occurs so as to generate audible noise and undesirable vibration, resulting in difficulty in driving the ultrasonic motor 700 silently.

SUMMARY OF THE INVENTION

A method for driving an ultrasonic motor according to the present invention is used for an ultrasonic motor comprising a vibrator for causing a flexural vibration wave in response to a pair of AC driving voltage signals, and a rotor in contact with the vibrator and moved by the flexural vibration wave, a rotational speed of the ultrasonic motor being controlled by using a feedback signal and a data table, the feedback signal indicating the current rotational speed of the ultrasonic motor, the data table storing values of the feedback signal as a standard function of the rotational speed. The method includes the steps of: sampling the feedback signal and detecting the rotational speed in a plurality of rotation states of the ultrasonic motor; obtaining an approximate function representing the relationship between the sampled feedback signal and the detected rotational speed; calculating correction coefficients for adjusting the approximate function to the standard function; and controlling the rotational speed of the ultrasonic motor by using the feedback signal. The controlling step includes a step of correcting the feedback signal obtained from the ultrasonic motor by using the correction coefficient, whereby a value of the approximate function is transformed into a corresponding value of the standard function.

In one embodiment of the invention, the standard function and the approximate function are linear functions, and the correction coefficients include a gradient correction coefficient and a shift correction coefficient.

In another embodiment of the invention, the feedback signal is obtained from a current flowing in the vibrator, the current being proportional to a vibration velocity of the vibrator in a circumferential direction of the vibrator.

In another embodiment of the invention, the feedback signal is obtained from a magnitude of vibration of the vibrator in a direction perpendicular to a face of the vibrator.

In another embodiment of the invention, the feedback signal is obtained from a phase difference between the driving voltage signals and a current flowing in the vibrator, the current being proportional to a vibration velocity of the vibrator in a circumferential direction of the vibrator.

A method for driving an ultrasonic motor according to the present invention is used for a ultrasonic motor comprising a vibrator for causing a flexural vibration wave in response to a pair of AC driving voltage signals, and a rotor in contact with the vibrator and moved by the flexural vibration wave. The method comprises the steps of: sweeping a driving frequency of the pair of AC driving voltage signals from a starting frequency higher than a resonance frequency of the vibrator in a stationary state when the ultrasonic motor is started driving; supplying supply power to the ultrasonic motor, the supply power being initially a minimum supply power capable of realizing a predetermined maximum rotation speed of the ultrasonic motor under a standard load; and when the driving frequency exceeds a frequency which is capable of realizing a maximum rotational power of the ultrasonic motor by a current supply power, shifting the driving frequency toward sufficiently higher than the resonance frequency of the vibrator in a stationary state, and increasing the supply power supplied to the ultrasonic motor in a stepwise manner.

In one embodiment of the invention, the method further comprises a step of decreasing gradually a rotational speed of the rotor when the rotor is stopped rotating.

In another embodiment of the invention, the step of decreasing gradually the rotational speed of the rotor is performed when a driving state of the ultrasonic motor changes from a rotational state to a stationary state in intermittent driving of the ultrasonic motor.

In another embodiment of the invention, the step of increasing the supply power is performed by increasing a duty ratio of a driving pulse signal for a step-up DC-DC converter.

In another embodiment of the invention, the step of decreasing gradually the rotational speed of the rotor is performed by sweeping the driving frequency applied to the vibrator toward higher.

In another embodiment of the invention, the step of decreasing gradually the rotational speed of the rotor is performed by stopping operation of a step-up DC-DC which supplies the supply power, and by decreasing gradually the driving voltage, the driving frequency remaining constant.

In another embodiment of the invention, the step of decreasing gradually the rotational speed of the rotor is performed by shifting gradually a phase difference between the pair of AC driving voltage signals from 90°.

A driving circuit for an ultrasonic motor according to the present invention is used for an ultrasonic motor comprising a vibrator for causing a flexural vibration wave in response to a pair of AC driving voltage signals, and a rotor in contact with the vibrator and moved by the flexural vibration wave. The driving circuit includes: a controlling circuit for controlling a rotational speed of the ultrasonic motored by using a feedback signal and a data table, the feedback signal indicating the current rotational speed of the ultrasonic motor, the data table storing values of the feedback signal as a standard function of the rotational speed; a circuit for sampling the feedback signal and for detecting the rotational speed in a plurality of rotation states of the ultrasonic motor; a unit for obtaining an approximate function representing the relationship between the sampled feedback signal and the detected rotational speed; and a unit for calculating correction coefficients for adjusting the approximate function to the standard function. The controlling circuit comprises a circuit for correcting the feedback signal obtained from the ultrasonic motor by using the correction coefficients whereby a value of the approximate function is transformed into a corresponding value of the standard function.

Thus, the invention described herein makes possible the advantages of (1) providing driving and accurate rotational speed controlling method for an ultrasonic motor by using correction coefficients for correcting a rotational speed signal; (2) providing method for driving an ultrasonic motor in which available rotational force can be always obtained without increase of power consumption, by increasing stepwise supply power and sweeping a driving frequency from that higher than the resonance frequency of the vibrator; (3) providing efficient and stable driving method for an ultrasonic motor by sweeping a driving method frequency from that higher than the resonance frequency of the vibrator; and (4) providing silent driving method for an ultrasonic motor by minimizing audible noise and undesirable vibration in the intermittent driving.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
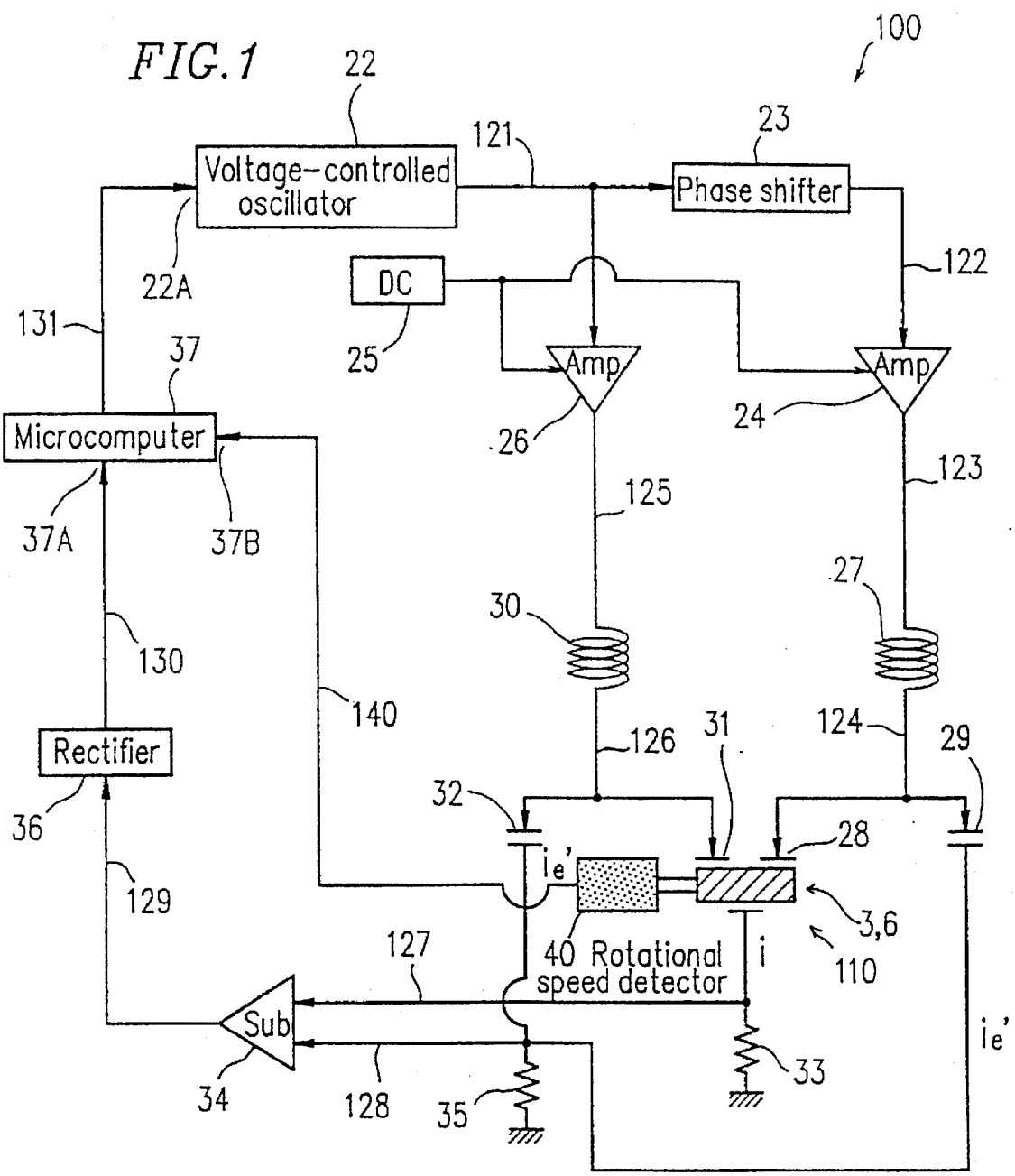
FIG. 1 is a block diagram of a rotational speed detecting circuit for an ultrasonic motor according to the present invention.

A first example of a method for driving an ultrasonic motor according to the present invention will be described. Referring initially to FIG. 1, a driving and rotational speed detecting circuit according to the present invention will be described for an ultrasonic motor 110 having the same structure as the ultrasonic motor 700 discussed above. The present invention is also applicable to another type of the ultrasonic motor 110 such as a ring-shape ultrasonic motor or a ultrasonic motor using a standing wave as will be appreciated based on the disclosure herein.

FIG. 1 is a block diagram of a driving and rotational speed detecting circuit 100 according to the present invention. Elements having the same structure as those of the conventional driving circuit 720 discussed above are denoted by the same numerical references.

The driving and rotational speed detecting circuit 100 comprises: a voltage-controlled oscillator 22; a phase shifter 23 connected to the output of the voltage-controlled oscillator 22; a power amplifier 24 connected to the output of the phase sifter 23; a power amplifier 26 connected to the output of the voltage-controlled oscillator 22; a direct current (DC) power supply 25 connected to the power amplifiers 24 and 26; coils 27 and 30 connected to the output of the power amplifiers 24 and 26, respectively, the outputs of the coils 27 and 30 being connected to driving electrode sets 28 and 31 on the piezoelectric member 2 (see FIG. 16) of the ultrasonic motor 110, respectively: capacitors 29 and 32 connected to the coils 27 and 30, respectively; a resistance 35 connected to outputs of the capacitor 29 and 32, another terminal of the resistance 35 being grounded; a resistance 33 having the same resistance value as that of the resistance 35, connected to an output of the piezoelectric member 2 of the ultrasonic motor 110, another terminal of the resistance 33 being grounded; a subtracter 34 connected to the resistances 33 and 35; a rectifier 36 connected to the subtracter 34, a microcomputer 37 connected to a frequency control input 22A of the voltage-controlled oscillator 22, an analog input 37A of which is connected to an output of the rectifier 36; and a rotational speed detector 40 connected a transmission axis 7 (see FIG. 16) of the ultrasonic motor 110, and connected to a digital input 37B of the microcomputer 37.

Operation of the driving and rotational speed detecting circuit 100 according to the present invention will be now described.

The microcomputer 37 applies an analog voltage signal 131 to the frequency control input 22A of the voltage-controlled oscillator 22. The analog voltage signal 131 corresponds to a driving frequency sufficiently higher than the resonance frequency of the vibrator 3 in the stationary state in order to start driving stably. The voltage-controlled oscillator 22 generates a pulse driving signal 121 based on the analog voltage signal 131. The pulse driving signal 121 from the voltage-controlled oscillator 22 is divided into two signals. One signal is shifted in phase by a predetermined amount (by +90° or −90°) by a phase shifter 23 and a resultant phase shifted signal 122 is input to a power amplifier 24. The power amplifier 24 amplifies the signal 122 to a level which is sufficiently high to drive the ultrasonic motor 110 base on supply power supplied from the DC power supply 25. The other signal is directly input from the voltage-controlled oscillator 22 to the power amplifier 26. The power amplifier 26 amplifies the signal to a level which is sufficiently high to drive the ultrasonic motor 110 based on supply power supplied from the DC power supply 25, outputting the resultant signal 125.

Figure 16:
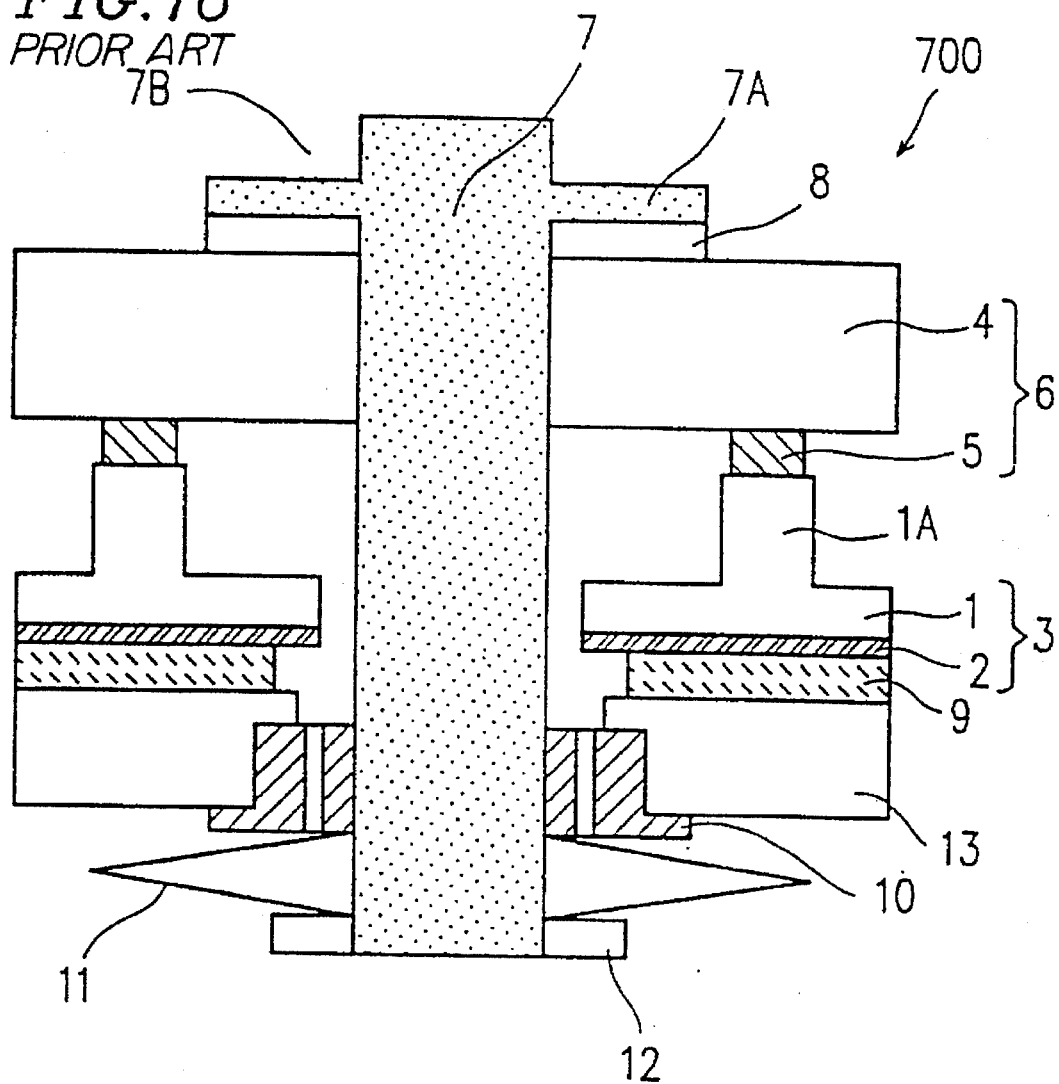
FIG. 16 is a cross-sectional view of a disc-type ultrasonic motor using a traveling wave.
Figure 17:
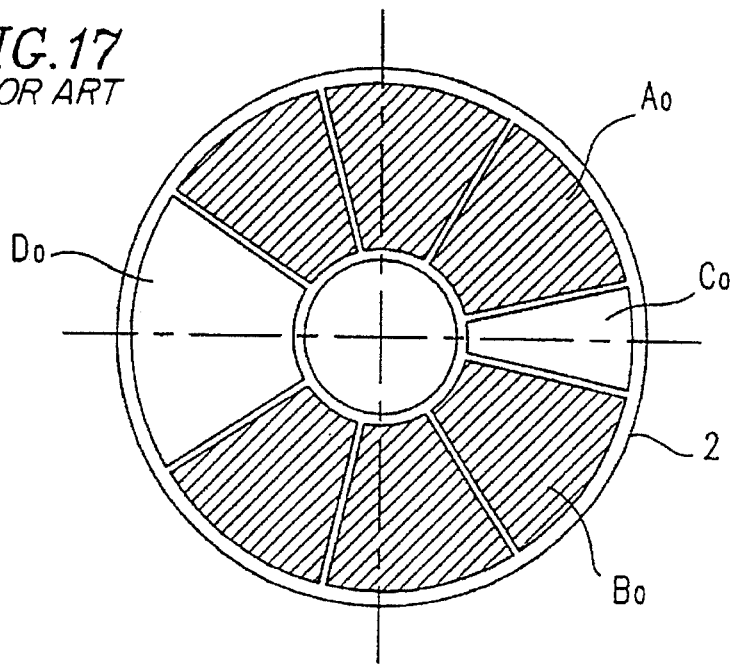
FIG. 17 is a graph illustrating a structure of the driving electrodes on the piezoelectric member.
Figure 18:
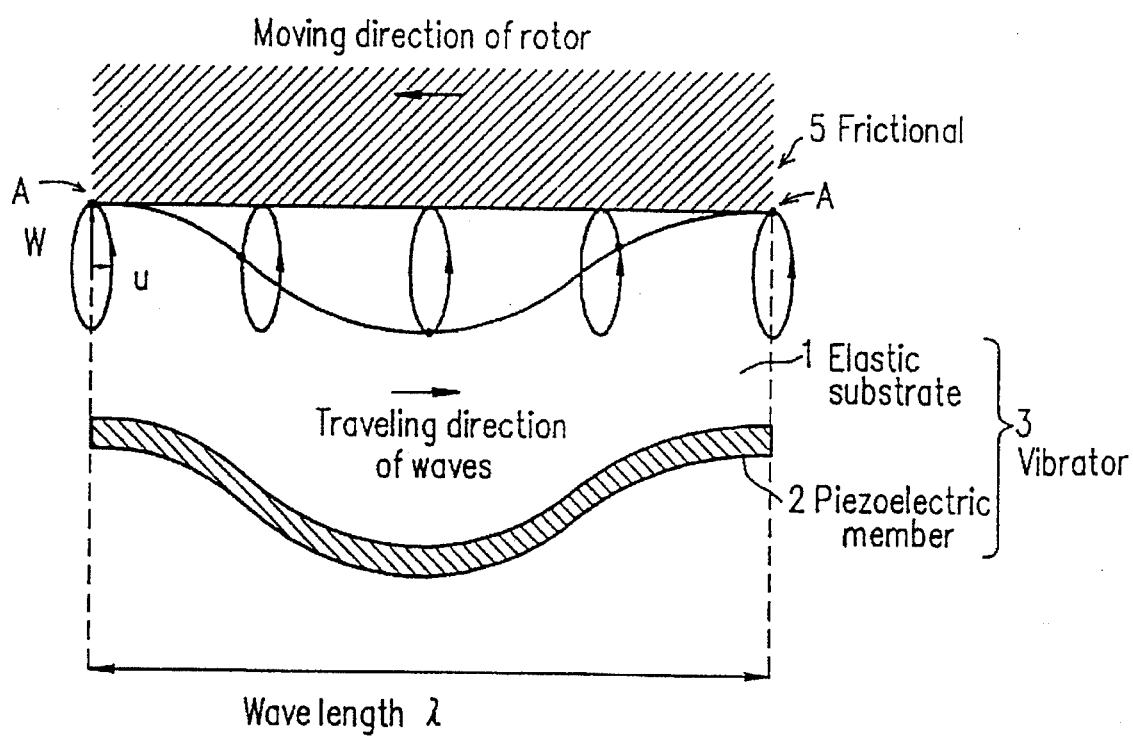
FIG. 18 is a view representing the operating principle of the disc-type ultrasonic motor.

Then, the waveform of the signal 723 from the power amplifier 24 is shaped by the coil 27, and then the shaped signal 124 is coupled to one driving electrode set 28 on the piezoelectric member 2 (see FIG. 16). The signal 124 is also coupled to a capacitor 29 which has an equivalent capacitance of the piezoelectric member 2 under the electrode set 28. Similarly, the waveform of the amplified signal 125 from the power amplifier 26 is shaped by the coil 30, and then the shaped signal 126 is coupled to the other driving electrode set 31 on the piezoelectric member 2. The signal 126 is also coupled to the capacitor 32 which has an equivalent capacitance of the piezoelectric member 2 under the electrode set 31.

By applying the pair of the signals 124 and 126 to the electrode sets 28 and 31, respectively, a traveling wave of a flexural vibration is excited on the vibrator 3. The rotor 6 is rotated in the opposite direction of the flexural traveling wave, as mentioned above, so that the ultrasonic motor 110 is driven. In the piezoelectric member 2, a total current i flows, which depends on the frequency and the magnitude of a voltage signal applied to the piezoelectric member 2 according to the signals 124 and 126. The total current i is linearly converted into a voltage signal 127 by the resistance 33 coupled to ground. The voltage signal 127 is then applied to one input of the subtracter 34.

Electric currents $i_e'$ equivalent to the electric branch current $i_e$ which flows in the electrode sets 28 and 31 depending on the frequency and the absolute value of the amplitude of the voltage signal applied to the piezoelectric member 2, are input to capacitors 29 and 32. These currents are applied together to the resistance 35 so as to be converted linearly into a voltage signal 128. The signal 128 is applied to another input of the subtracter 34.

Figure 19:
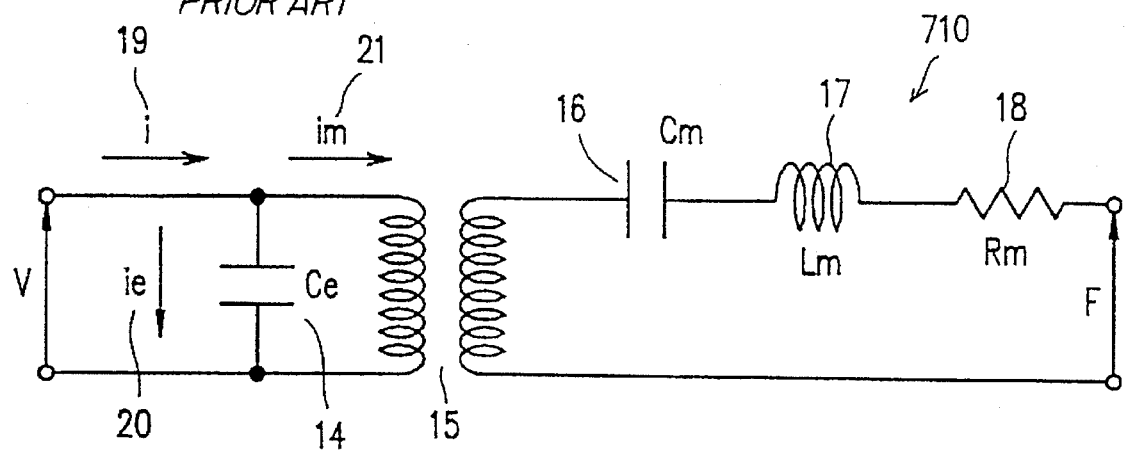
FIG. 19 is a view showing an equivalent circuit of the vibrator.
Figure 20:
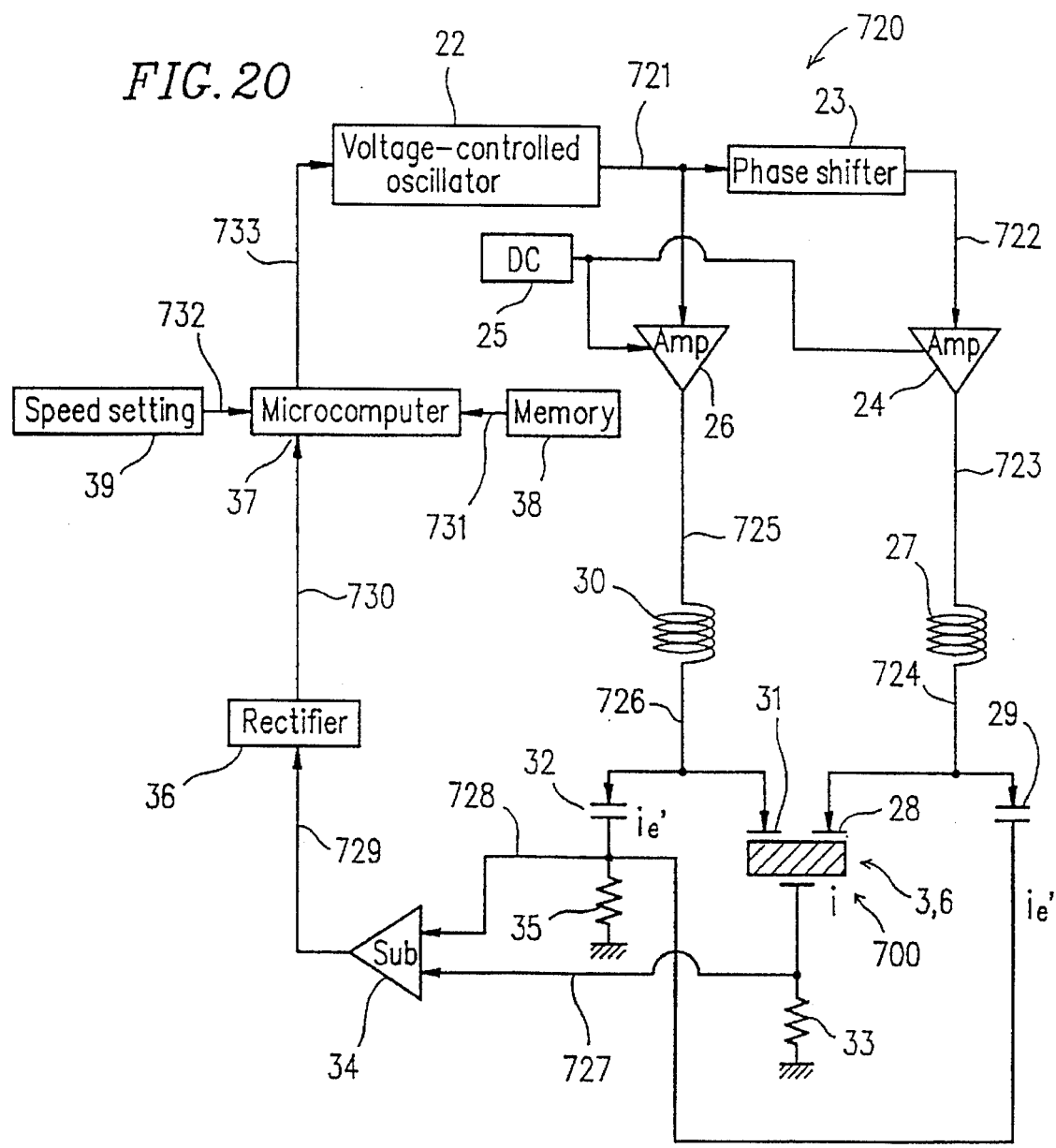
FIG. 20 is a block diagram of a conventional driving circuit for the ultrasonic motor.

The output of the subtracter 34 is a voltage signal 129 which has a differential value obtained by subtracting the voltage signal 128 (the total current i) from the voltage signal 127 (the electric branch current $i_e$). Therefore, the voltage signal 129 is proportional to the mechanical branch current $e_m$ (shown in FIG. 19). The mechanical branch current $e_m$ is proportional to the vibration velocity of the vibrator 3, so as to be proportional to the rotational speed of the rotor 6, as discussed above. Thus, the voltage signal 129 is proportional to the rotational speed of the rotor 6 and used for indicating the rotational speed of the rotor 6.

The output signal 129 of the subtracter 34 is converted into a DC voltage signal 130 by the rectifier 36. The signal 130 is a rotational speed signal S which indicates the rotational speed obtained from the mechanical branch current $e_m$, and applied to the analog input 37A of the microcomputer 37.

The rotational speed detector 40 directly detects an actual rotational speed of the ultrasonic motor 110 by using a sensor which generates a signal proportional to the actual rotational speed (e.g. revolution per minute). The sensor may be implemented by using rotary encoder, tachometer, or the like. The rotational speed detector 40 sends a data signal 140 which indicates the actual rotational speed (R) to the digital input of the microcomputer 37.

Figure 2:
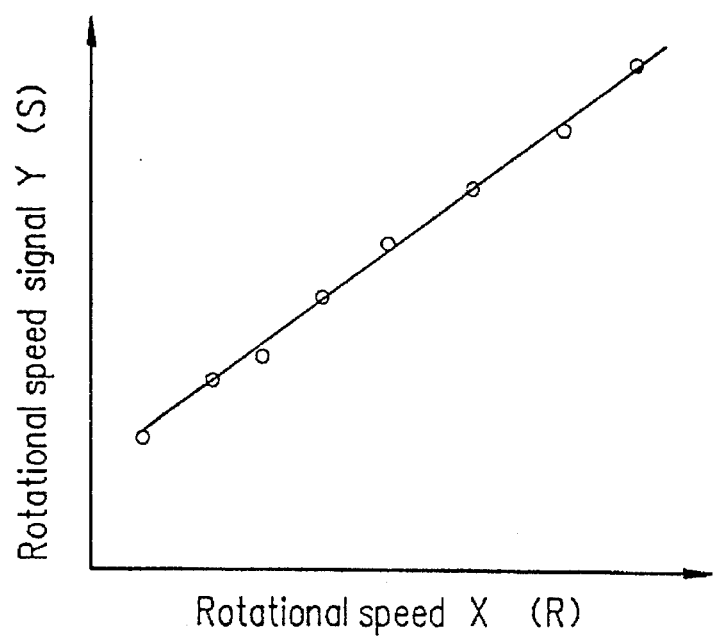
FIG. 2 is a graph illustrating the relationship between the rotational speed of the ultrasonic motor and the rotational speed signal.

FIG. 2 shows the relationship between the rotational speed R and the rotational speed signal S. By changing the driving signal 121, the rotational speed signal S is sampled at a plurality of the rotational speeds R. The microcomputer 37 determines a function Y=f(X) which represents the relationship between the rotational speed R and the rotational speed signal S, by using least squares method. In FIG. 2, each small circle denotes the sampled value and a line denotes an approximated linear function expressed by Equation (6):

$$Y_1 = A_1 X + B_1 \tag{6}$$

where, X denotes the actual rotational speed obtained from the data signal 140 output from the rotation detector 40, and Y denotes the voltage value of the rotational speed signal S, which is proportional to the mechanical branch current $e_m$.

When the ultrasonic motor 110 is driven, the rotational speed is controlled by using predetermined data table of the rotational speed R and the rotational speed signal S stored in a memory 38, discussed more fully below in relation to FIG. 4. The data stored in the memory 38 is expressed by Equation (7).

$$Y_2 = A_2 X + B_2 \tag{7}$$

Figure 3:
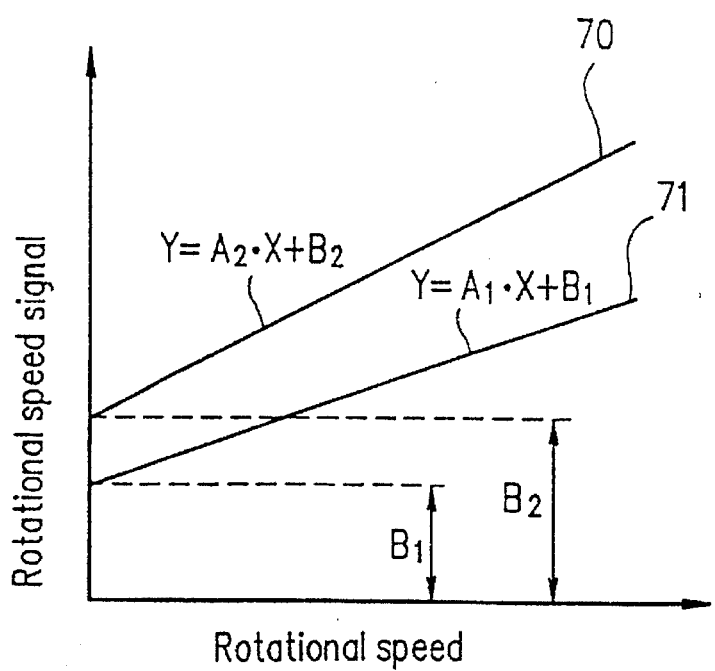
FIG. 3 is a graph representing a method for correcting the rotational speed signal.

FIG. 3 illustrates two liner functions represented by Equations (6) and (7). A line 71 indicates the linear function expressed by Equation (6), and a line 70 indicates the linear function expressed by Equation (7).

The microcomputer 37 has been set to control the rotational speed based on the data table stored in the memory 38.

Therefore, it is required to adjust the rotational speed signal 130 which intrinsically varies among individual ultrasonic motors, so that the actual rotation speed is reflected on the rotational speed control by the microcomputer 37. That is, the relationship expressed by Equation (6) for the intrinsic rotational speed signal 130 is required to be transformed into the relationship expressed by Equation (7) which is stored as a data table in the memory 38. The transformation needs to be performed on the rotational speed signal 130 before it is applied to the microcomputer 37, or to be performed in the microcomputer 37 before the value of the rotation speed signal 130 is compared with a target speed.

As seen from FIG. 3, a transformed value $Y_2$ is obtained from the value $Y_1$ of the rotational speed signal 130 as expressed by Equation (8).

$$Y_2 = A_2/A_1 \times (Y_1 - B_1) + B_2 \qquad (8)$$

The coefficients $A_1$ and $B_1$ are obtained from the data signal 140 output form the rotation speed detector 40, and the coefficients $A_2$ and $B_2$ are given in the memory 38. By using the coefficients $A_2/A_1$, $B_1$, and $B_2$ as correction coefficients, variations in the relationship between the rotation speed signal 6 and the actual rotation speed R among individual ultrasonic motors are compensated, so as to realize an accurate rotational speed control for the ultrasonic motor.

A method for driving the ultrasonic motor 11D using the above mentioned method of correcting the rotational speed signal will be now described with reference to FIG. 4.

Figure 4:
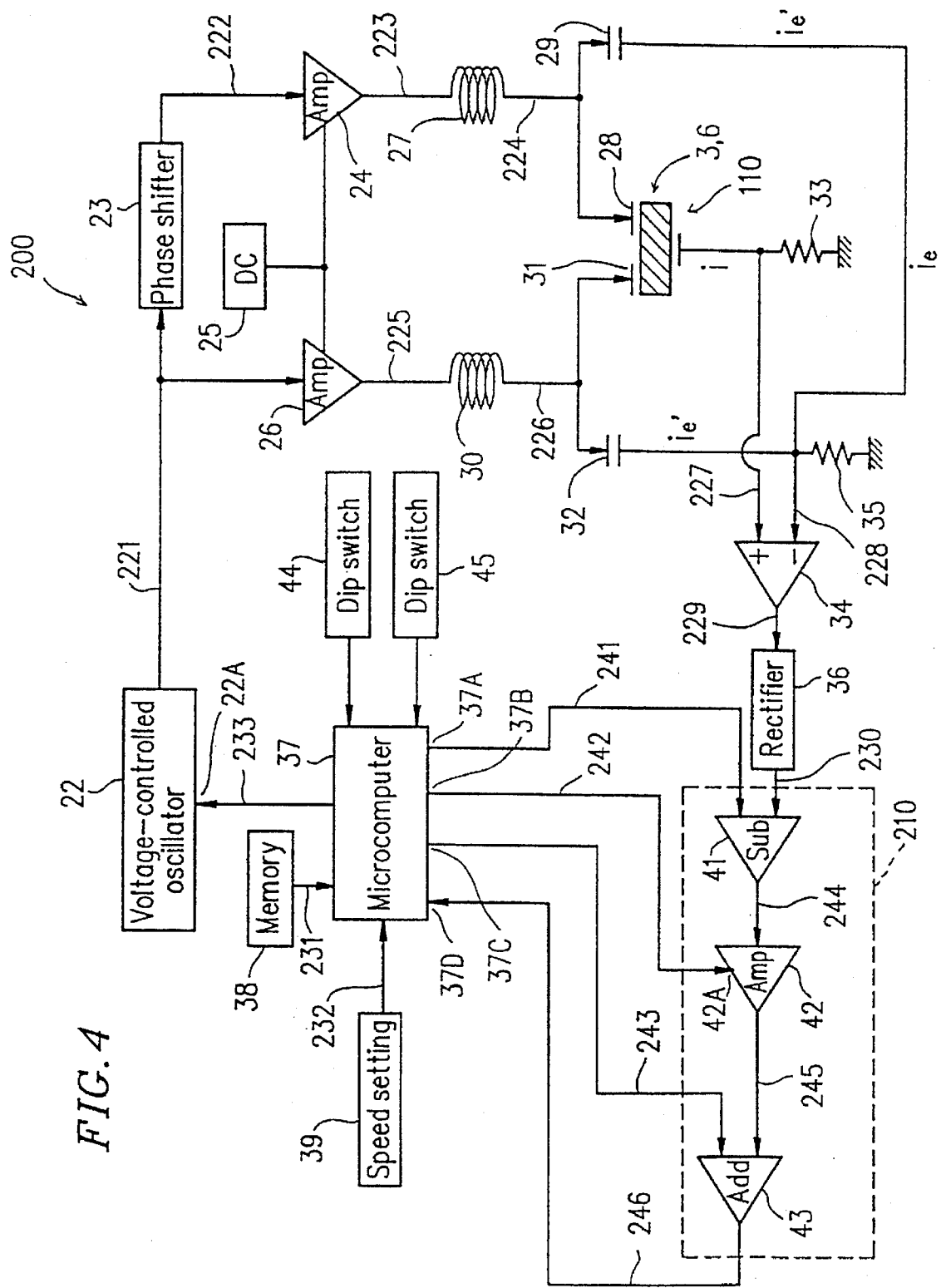
FIG. 4 is a block diagram of a driving circuit for an ultrasonic motor according to one embodiment of the present invention.

FIG. 4 is a block diagram of a driving circuit 200 according to the present invention. As shown in FIG. 4, the driving circuit 200 includes a rotational speed adjusting circuit 210 and DIP switches 44 and 45. Elements having the same structure as those of the driving and rotational speed detecting circuit 100 discussed above are denoted by the same numerical references.

The driving circuit 200 comprises: a voltage-controlled oscillator 22; a phase shifter 23 connected to the output of the voltage-controlled oscillator 22; a power amplifier 24 connected to the output of the phase sifter 23; a power amplifier 26 connected to the output of the voltage-controlled oscillator 22; a direct current (DC) power supply 25 coupled to the power amplifiers 24 and 26; coils 27 and 30 connected to the output of the power amplifiers 24 and 26, respectively, the outputs of the coils 27 and 30 being connected to driving electrode sets 28 and 31 on the piezoelectric member 2 (see FIG. 16) of the ultrasonic motor 110, respectively; capacitors 29 and 32 connected to the coils 27 and 30, respectively; a resistance 35 connected to ouputs of the capacitor 29 and 32, another terminal of the resistance 35 being grounded; a resistance 33 having the same resistance value as that of the resistance 35, connected to an output of the piezoelectric member 2 of the ultrasonic motor 110, another terminal of the resistance 33 being grounded; a subtracter 34 connected to the resistances 33 and 35; a rectifier 36 connected to the subtracter 34; a microcomputer 37 connected to a frequency control input 22A of the voltage-controlled oscillator 22, the analog input 37A of which is connected to an output of the rectifier 36; a rotational speed adjusting circuit 210 including a subtracter 41, a voltage-controlled amplifier 42, and a adder 43; a first DIP switch 44 and a second DIP switch 45 connected to the respective inputs of the microcomputer 37; and a memory 38 and a speed setting unit 39 connected to the respective inputs of the microcomputer 37.

The structure of the rotational speed adjusting circuit 210 is as follows. The output of the rectifier 36 is connected to one input of the subtracter 41 of the rotational speed adjusting circuit 210. The other input of the subtracter 41 is connected to the analog output 37A of the microcomputer 37. The output of the subtracter 41 is connected to the input of the voltage-controlled amplifier 42. The amplitude control input 42A of the voltage-controlled amplifier 42 is connected to the analog output 37B of the microcomputer 37. The output of the voltage-controlled amplifier 42 is connected to the one input of the adder 43, and the other input of the adder 43 is connected to the analog output 37C of the microcomputer 37. The output of the adder 43 is connected to the analog input 37D of the microcomputer 37.

Operation of the driving circuit 200 according to the present invention will be now described.

The microcomputer 37 compares a data signal 246 input from the adder 43 of the rotational speed adjusting circuit 210 with the data table (data table signal 231) of the rotational speed R and the rotational speed signal S stored in the memory 38. The microcomputer 37 then compares the result of the comparatione of the data signal 246 and the data table with a target speed signal 232 which is input from the speed setting unit 39. The microcomputer 37 generates an analog voltage signal corresponding to an appropriate frequency for realizing the target speed in the ultrasonic motor 110. The analog voltage signal 223 is input to the frequency control input 22A of the voltage-controlled oscillator 22. The voltage-controlled oscillator 22 generates a driving signal 221 based on the analog voltage signal 233.

The driving signal 221 from the voltage-controlled oscillator 22 is divided into two signals. One signal is shifted in phase by a predetermined amount (by +90° or −90°) by a phase shifter 23 and a resultant phase shifted signal 222 is input to a power amplifier 24. The power amplifier 24 amplifies the signal 222 to a level which is sufficiently high to drive the ultrasonic motor 110 based on supply power supplied from the DC power supply 25. The other signal is directly input from the voltage-controlled oscillator 22 to the power amplifier 26. The power amplifier 26 amplifies the signal to a level which is sufficiently high to drive the ultrasonic motor 110 based on supply power supplied from the DC power supply 25, outputting the resultant signal 225.

The waveform of the signal 223 from the power amplifier 24 is shaped by the coil 27, and then the shaped signal 224 is coupled to one driving electrode set 28 on the piezoelectric member 2 (see FIG. 16). The signal 224 is also coupled to a capacitor 29 which has an equivalent capacitance of the piezoelectric member 2 under the electrode set 28. Similarly, the waveform of the amplified signal 225 from the power amplifier 26 is shaped by the coil 30, and then the shaped signal 226 is coupled to the other driving electrode set 31 on the piezoelectric member. The signal 226 is also coupled to the capacitor 32 which has an equivalent capacitance of the piezoelectric member under the electrode set 31.

By applying the pair of the signals 224 and 226 to the electrode sets 28 and 31, respectively, a traveling wave of a flexural vibration is excited on the vibrator 3. The rotor 6 is rotated in the opposite direction of the flexural traveling wave, as mentioned above, so that the ultrasonic motor 110 is driven. In the piezoelectric member, a total current i flows, which depends on the frequency and the magnitude of a voltage signal applied to the piezoelectric member according to the signals 224 and 226. The total current i is linearly converted into a voltage signal 227 by the resistance 33 coupled to ground. The voltage signal 227 is then applied to one input of the subtracter 34.

Electric currents $i_e'$ equivalent to the electric branch current $i_e$ which flows in the electrode sets 28 and 31 depending on the frequency and the absolute value of the amplitude of the voltage signal applied to the piezoelectric member 2, are input to capacitors 29 and 32. These currents are applied together to the resistance 35 so as to be converted linearly into a voltage signal 228. The signal 228 is applied to another input of the subtracter 34.

The output of the subtracter 34 is a voltage signal 229 which has a differential value obtained by subtracting the voltage signal 228 (the total current i) from the voltage signal 227 (the electric branch current $i_e$). Therefore, the voltage signal 229 is proportional to the mechanical branch current $e_m$ (shown in FIG. 19). The mechanical branch current $e_m$ is proportional to the vibration velocity of the vibrator 3, so as to be proportional to the rotational speed of the rotor 6, as discussed above. Thus, the voltage signal 229 is proportional to the rotational speed of the rotor 6 and used for indicating the rotational speed of the rotor 6.

The output signal 229 of the subtracter 34 is converted into a DC voltage signal 230 by the rectifier 36. The signal 230 is a rotational speed signal S which indicates the rotational speed obtained from the mechanical branch current $e_m$, and applied to one input of the subtracter 41 of the rotational speed adjusting circuit 210.

The rotational speed signal 230 is adjusted as follows. The correction coefficient $B_1$ is, as described above, indicates a shift of $Y_1$ from $Y_2$ (see Equations (6) to (8)). The first DIP switch 44 is set based on the shift correction coefficient $B_1$. The microcomputer 37 generates a correction signal 241 of an analog voltage signal corresponding to the shift coefficient $B_2$ based on the setting of the first DIP switch 44. The correction signal 241 is output from the analog output 37A and input to the input of the subtracter 41 of the rotational speed adjusting circuit 210. The subtracter 41 subtracts the value $B_1$ from the value $Y_1$ of the rotational speed signal (S) 230, and output the resultant signal 244 to the input of the voltage-controlled amplifier 42.

The coefficient $A_1$ indicates a gradient of the $Y_1$ (see Equation (6)). The second DIP switch 45 is set based on the gradient coefficient $A_1$. The microcomputer 37 calculates a gradient correction coefficient $A_2/A_1$ based on the setting of the second DIP switch 45 and the data tabes stored in the memory 38 (see Equation (8)). The microcomputer 37 generates a correction signal 242 of an analog voltage signal corresponding to the gradient coefficient $A_2/A_1$. The correction signal 242 is output from the analog output 37B and input to the amplitude control input 42A of the voltage-controlled amplifier 42 of the rotational speed adjusting circuit 210. The voltage-controlled amplifier 42 amplifies the input signal 244 by $A_2/A_1$ and outputs the resultant signal 245 to one input of the adder 43.

The coefficient $B_2$ indicates a sift of $Y_2$ from the origin (see Equation (7)). The microcomputer 37 generates a correction signal 243 as an analog voltage signal corresponding to the coefficient $B_2$. The correction signal 243 is output from the analog output 37C and input to the other input of the adder 43 of the rotational speed adjusting circuit 210. The adder 43 adds the value $B_2$ to the value of the input signal 245 and outputs the resultant signal 246 to the analog input 37D of the microcomputer 37.

As described above, according to the correcting method of the present invention, the rotational speed signal 230 is corrected and adjusted to the data tables stored in the memory 38 by using the correction coefficients. Therefore, even if the rotational speed signal (s) 230 varies among individual ultrasonic motors, the actual rotation speed (R) is reflected on the rotational speed control by the microcomputer 37. This makes it possible to realize an accurate control of the rotational speed of the ultrasonic motor.

In this example, the mechanical branch current is used for obtaining the rotational speed signal of the ultrasonic motor. Data based on a magnitude of an output signal of a sensor electrode of the ultrasonic motor may be used for obtaining the rotational speed signal of the ultrasonic motor. The sensor electrode is provided on the piezoelectric member 2 in order to pickup electrically the vibration of the vibrator 3 in a direction perpendicular to a face of the vibrator 3.

A phase difference between the applied voltage signal and the mechanical branch current may be also used for obtaining the rotational speed signal of the ultrasonic motor.

In addition, a linear function is used as an approximation function representing the relationship between the rotational speed signal S and the actual rotational speed R in this example. A higher order function may be used as an approximation function with the corresponding correction coefficients. The divisional linear approximation may be used for obtaining the approximation function.

EXAMPLE 2

Figure 5:
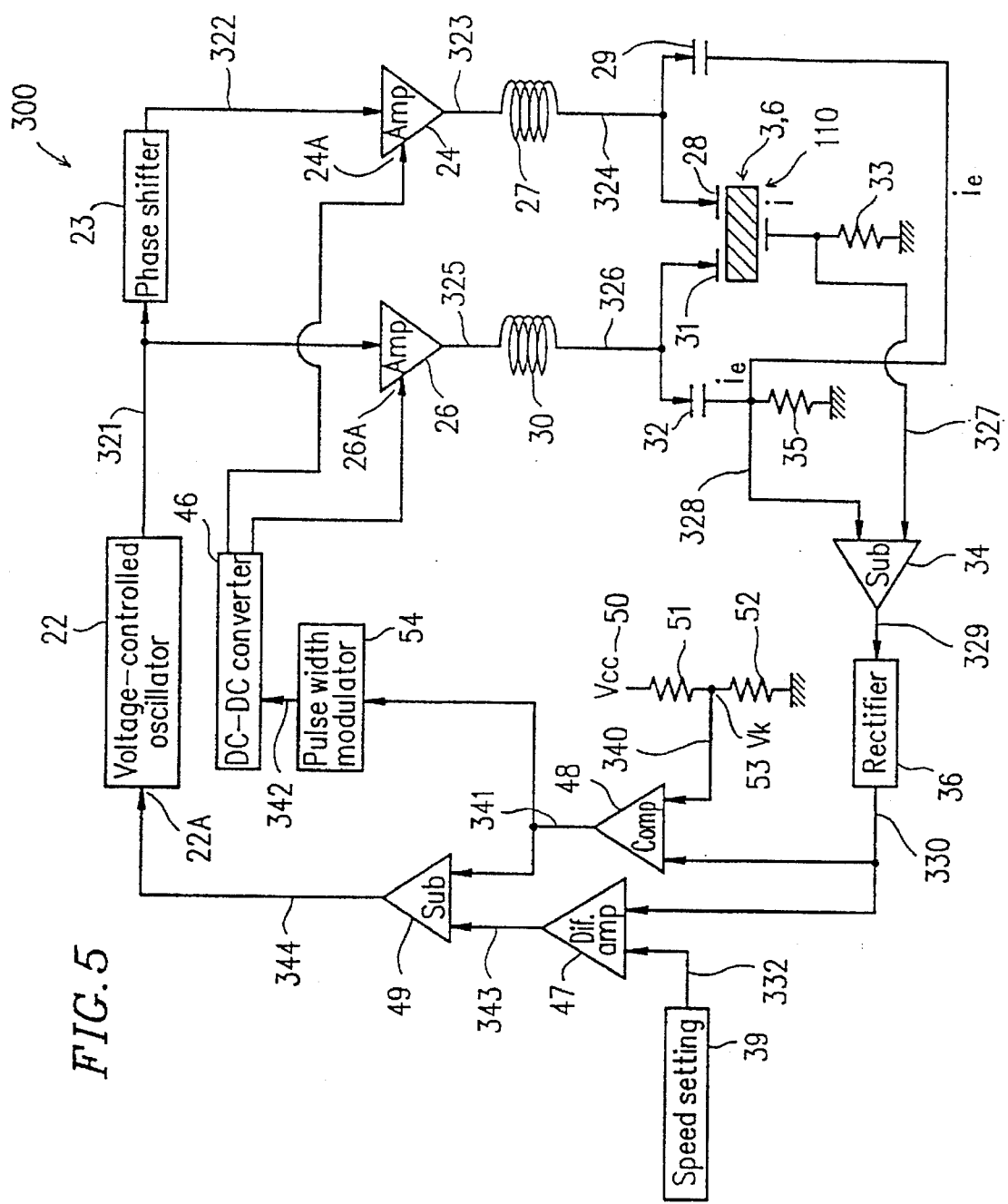
FIG. 5 is a block diagram of a driving circuit for an ultrasonic motor according to another embodiment of the present invention.

A second example of a method for driving an ultrasonic motor according to the present invention will be described. Referring to FIG. 5, a driving circuit 300 according to the present invention will be described for an ultrasonic motor 110 having the same structure as the ultrasonic motor 700 discussed above.

The present invention is also applicable to another type of the ultrasonic motor 110 such as a ring-shaped ultrasonic motor or a ultrasonic motor using a standing wave as will be appreciated based on the disclosure herein.

FIG. 5 is a block diagram of a driving circuit 300 in another embodiment according to the present invention. As shown in FIG. 5, elements having the same structure as those of the driving circuit 200 discussed above are denoted by the same numerical references.

The driving circuit 300 comprises: a voltage-controlled oscillator 22; a phase shifter 23 connected to the output of the voltage-controlled oscillator 22; a power amplifier 24 connected to the output of the phase sifter 23; a power amplifier 26 connected to the output of the voltage-controlled oscillator 22; a DC-DC convertor 46 coupled to the power supply input 24A of the power amplifiers 24 and the power supply input 26A of the power amplifier 26; coils 27 and 30 connected to the output of the power amplifiers 24 and 26, respectively, the outputs of the coils 27 and 30 being connected to driving electrode sets 28 and 31 on the piezoelectric member 2 (see FIG. 16) of the ultrasonic motor 110, respectively; capacitors 29 and 32 connected to the coils 27 and 30, respectively; a resistance 35 connected to outputs of the capacitor 29 and 32, another terminal of the resistance 35 being grounded; a resistance 33 having the same resistance value as that of the resistance 35, connected to an output of the piezoelectric member 2 of the ultrasonic motor 110, another terminal of the resistance 33 being grounded; a subtracter 34 connected to the resistances 33 and 35; a rectifier 36 connected to the subtracter 34; a differential amplifier 47 connected to the output of the rectifier 36; a comparator 48 one input of which is connected to the output of the rectifier 36; a subtracter 49 coupled to the respective outputs of the differential amplifier 47 and the comparator 48, and connected to the voltage control input 22A of the voltage-controlled oscillator 22; a speed setting unit 39 connected to one input of the differential amplifier 47; and a pulse width modulator 54 connected to the output of the comparator 48 and connected to the voltage control input of the DC-DC convertor 46.

The other input of the comparator 48 is connected to resistances 51 and 52. Another terminal of the resistance 51 is connected to the power supply voltage ($V_{cc}$) 50, and another terminal of the resistance 52 is grounded, so that a divisional voltage ($V_k$) 53 is applied to the other input of the comparator 48.

Operation of the driving circuit 300 according to the present invention will be now described.

The voltage-controlled oscillator 22 generates a pulse driving signal 321 which has a frequency corresponding to a given target speed of the ultrasonic motor 110. The pulse driving signal 321 from the voltage-controlled oscillator 22 is divided into two signals. One signal is shifted in phase by a predetermined amount (by +90° or −90°) by a phase shifter 23 and a resultant phase shifted signal 322 is input to a power amplifier 24. The power amplifier 24 amplifies the signal 322 so that the resultant signal 323 has a power according to DC supply power supplied from the DC-DC convertor 46 to the power supply input 24A thereof. The other signal is directly input from the voltage-controlled oscillator 22 to the power amplifier 26. The power amplifier 26 amplifies the signal so that the resultant signal 325 has a power according to DC supply power supplied from the DC-DC convertor 46 to the power supply input 26A thereof. When the ultrasonic motor 110 is started driving, the initial voltage of the DC power which is supplied to the power amplifiers 24 and 26 from the DC-DC convertor 46 is set at a minimum voltage level which is capable of driving the ultrasonic motor 110 under a standard load at a maximum rotational speed which is predetermined by the specification thereof.

The waveform of the signal 323 from the power amplifier 24 is shaped by the coil 27, and then the shaped signal 324 is coupled to one driving electrode set 28 on the piezoelectric member 2 (see FIG. 16). The signal 324 is also coupled to a capacitor 29 which has an equivalent capacitance of the piezoelectric member 2 under the electrode set 28. Similarly, the waveform of the amplified signal 325 from the power amplifier 26 is shaped by the coil 30, and then the shaped signal 326 is coupled to the other driving electrode set 31 on the piezoelectric member. The signal 326 is also coupled to the capacitor 32 which has an equivalent capacitance of the piezoelectric member under the electrode set 31.

By applying the pair of the signals 324 and 326 to the electrode sets 28 and 31, respectively, a traveling wave of a flexural vibration is excited on the vibrator 3. The rotor 6 is rotated in the opposite direction of the flexural traveling wave, as mentioned above, so that the ultrasonic motor 110 is driven. In the piezoelectric member, a total current i flows, which depends on the frequency and the magnitude of a voltage signal applied to the piezoelectric member according to the signals 324 and 326. The total current i is linearly converted into a voltage signal 327 by the resistance 33 coupled to ground. The voltage signal 327 is then applied to one input of the subtracter 34.

Electric currents $i_e'$ equivalent to the electric branch current $i_e$ which flows in the electrode sets 28 and 31 depending on the frequency and the absolute value of the amplitude of the voltage signal applied to the piezoelectric member 2, are input to capacitors 29 and 32. These currents are applied together to the resistance 35 so as to be converted linearly into a voltage signal 328. The signal 328 is applied to another input of the subtracter 34.

The output of the subtracter 34 is a voltage signal 329 which has a differential value obtained by subtracting the voltage signal 328 (the total current i) from the voltage signal 327 (the electric branch current $i_e$. Therefore, the voltage signal 329 is proportional to the mechanical branch current $e_m$ (shown in FIG. 19). The mechanical branch current $e_m$ is proportional to the vibration velocity of the vibrator 3, so as to be proportional to the rotational speed of the rotor 6, as discussed above. Thus, the voltage signal 329 is proportional to the rotational speed of the rotor 6 and used for indicating the rotational speed of the rotor 6.

The output signal 329 from the subtracter 34 is converted into a DC voltage signal 330 by the rectifier 36. The signal 330 is a rotational speed signal S which indicates the rotational speed obtained from the mechanical branch current $e_m$. The signal 330 is divided into two, one of which is coupled to the one input of the differential amplifier 47, and the other of which is coupled to one input of the comparator 48.

The differential amplifier 47 compares the value of the signal 330 (the rotational speed signal S) with the target speed signal 332 input from the speed setting unit 39, and generates an error signal 343. The error signal 343 represents the difference between the target rotational speed given by the speed setting unit 39 and the current rotational speed of the ultrasonic motor 110 which is indicated by the rotational speed signal 330. The error signal 343 is input to the one input of the subtracter 49.

The comparator 48 compares the rotational speed signal 330 input to one input with a signal 340 input to the other input. The signal corresponds to the divisional voltage ($V_k$) 53 which is obtained by dividing the power supply voltage ($V_{cc}$) 50 with the resistances 51 and 52.

Figure 6:
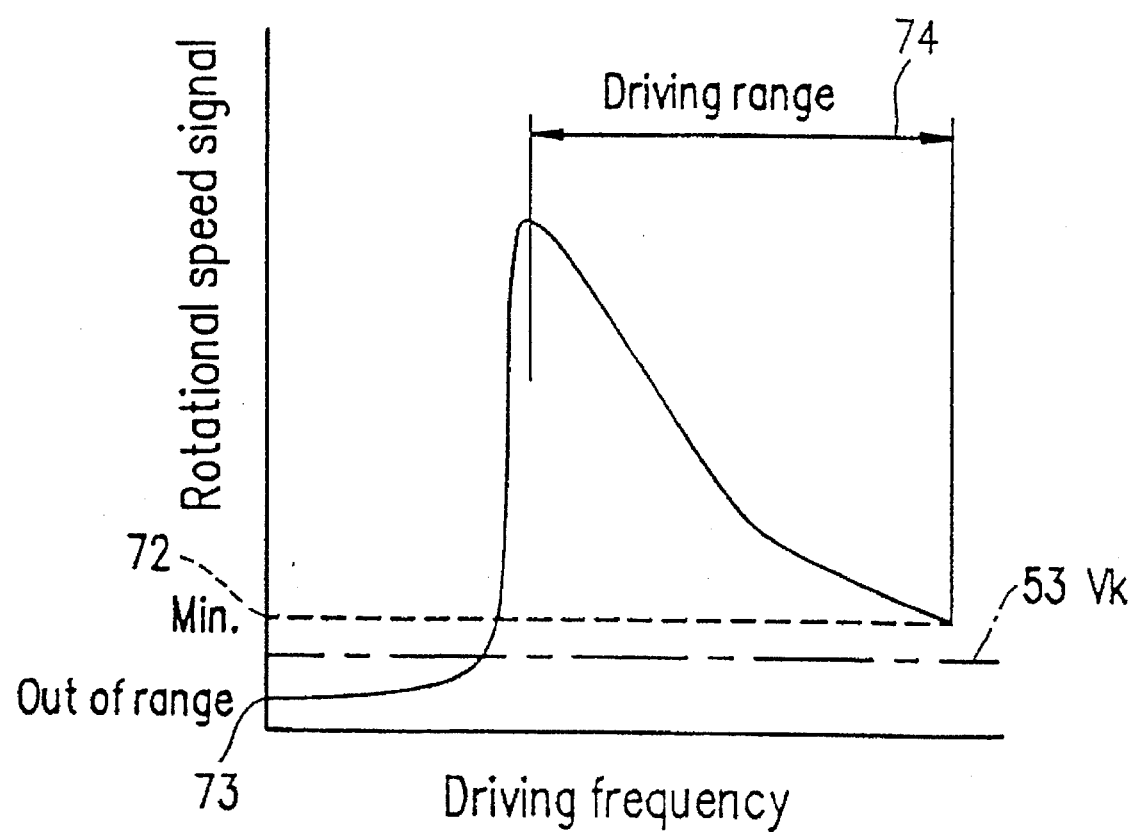
FIG. 6 is a graph illustrating the relationship between the driving frequency of the ultrasonic motor and the rotational speed signal.

FIG. 6 shows the setting of the divisional voltage 53. As shown in FIG. 6, the divisional voltage 53 has an approximate mean value between a minimum voltage 72 of the driving range 74 which is capable of driving the ultrasonic motor, and a voltage 73 of the rotational speed signal 330 which is obtained when a driving frequency of ultrasonic motor is out of the driving range 74.

When the driving frequency leaves the driving range 74 of the current power supply supplied from the DC-DC convertor 46 due to such as an over load on the ultrasonic motor 110, the output signal 341 goes high. The subtracter 49 decreases the level of the output signal 344 based on the signal 341 at a high level.

Figure 10:
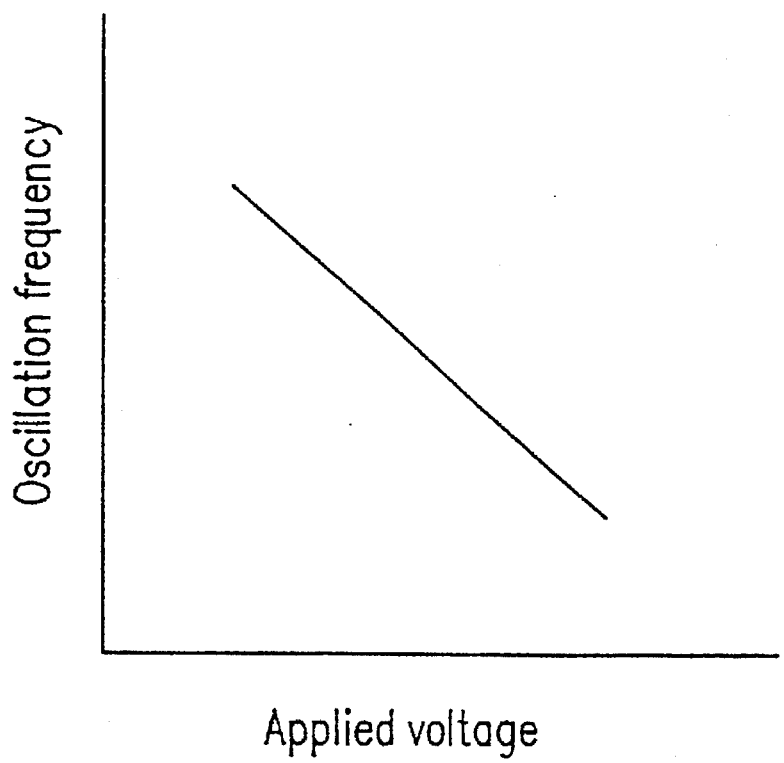
FIG. 10 is a graph illustrating the relationship between the oscillation frequency and the applied voltage of the voltage-controlled oscillator.

FIG. 10 shows the relationship between the oscillation frequency of the voltage-controlled oscillator 22 and the control voltage input to the voltage control input 22A thereof. Accordingly, by lowering the level of the signal 341, the oscillation frequency of the voltage-controlled oscillator 22 is increased to be sufficiently higher than the resonance frequency of the vibrator 3 in the stationary state. Thus, the voltage-controlled oscillator 22 begins oscillating at the sufficiently higher frequency, so that the ultrasonic motor 110 is started driving again.

The lowering amount of the voltage level of the control signal 344 is appropriately determined based on characteristics of the ultrasonic motor 110, so that the oscillation frequency of the voltage-controlled oscillator 22 is increased to be sufficiently higher than the resonance frequency of the vibrator 3 in the stationary state. For example, in a case where the resonance frequency is 60 kHz, the starting driving frequency may be swept from 62 kHz.

Figure 7:
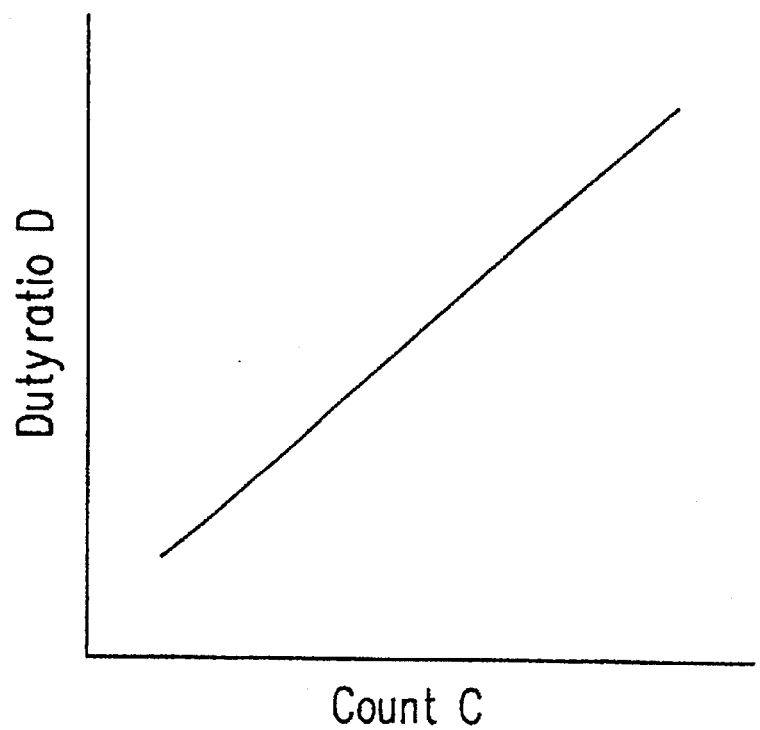
FIG. 7 is a graph illustrating the relationship between the count value of pulses and the duty ratio of the output pulse.

The signal 341 is also coupled to the pulse width modulator 54 from the comparator 48. The pulse width modulator 54 counts rising edges of the signal 341 by a counter (not shown). The pulse width modulator 54 output a pulse signal 342 which has a duty ratio D based on the count C of the counter. FIG. 7 shows the relationship between the count C and the duty ratio D of the pulse signal 342. As shown in FIG. 7, the duty ratio D is proportional to the count C. The pulse signal 342 is input to the DC-DC converter 46.

Figure 8:
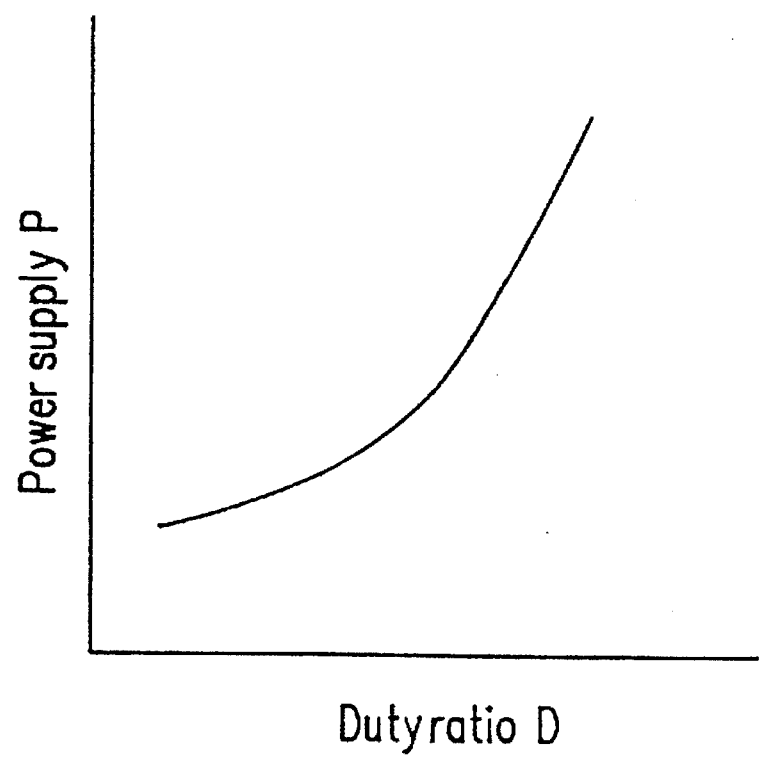
FIG. 8 is a graph illustrating the relationship between the duty ratio and the power supply.

The DC-DC converter 46 changes the output power supply P based on the duty ratio D of the input signal 342 as shown in FIG. 8. As the count C increase, the output power supply P of the DC-DC converter 46 increase (see FIGS. 7 and 8). Accordingly, every time the ultrasonic motor 110 is over-loaded and the driving frequency thereof leaves the driving range, the power supply P from the DC-DC converter 46 is increased.

Figure 9:
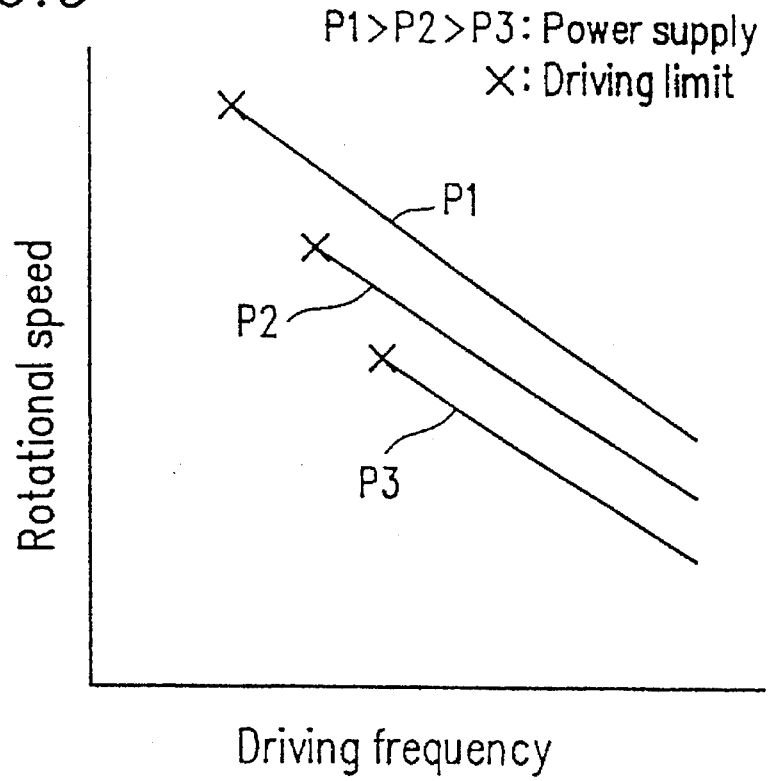
FIG. 9 is a graph illustrating the relationship between the power supply and the driving frequency limit.

FIG. 9 shows the driving frequency limit (indicated by x) with respect to the power supply P (indicated by P1, P2 and P3). As shown in FIG. 9, the higher the power supply P, the higher the frequency limit for driving the ultrasonic motor 110.

As described above, according to the present invention, when the driving frequency of the ultrasonic motor 110 leaves the driving range of the current power supply of the DC-DC convertor 46, the ultrasonic motor 110 is restarted by setting the driving frequency at a sufficiently higher than the resonance frequency of the vibrator 3 in the stationary state. Furthermore, every time the driving frequency of the ultrasonic motor 110 leaves the driving range, the power supply P from the DC-DC converter 46 is increased stepwise. Accordingly, by using the method and circuit for driving the ultrasonic motor 110, an available rotational force can be always obtained from the ultrasonic motor 110 without an increase of power consumption.

In this example, the power supply P of the DC-DC converter 46 is controlled by changing the duty ratio D of the pulse signal 342. The power supply P of the DC-DC converter 46 may be controlled by changing the frequency of the pulse signal 342 with a constant duty ratio D.

EXAMPLE 3

Figure 11:
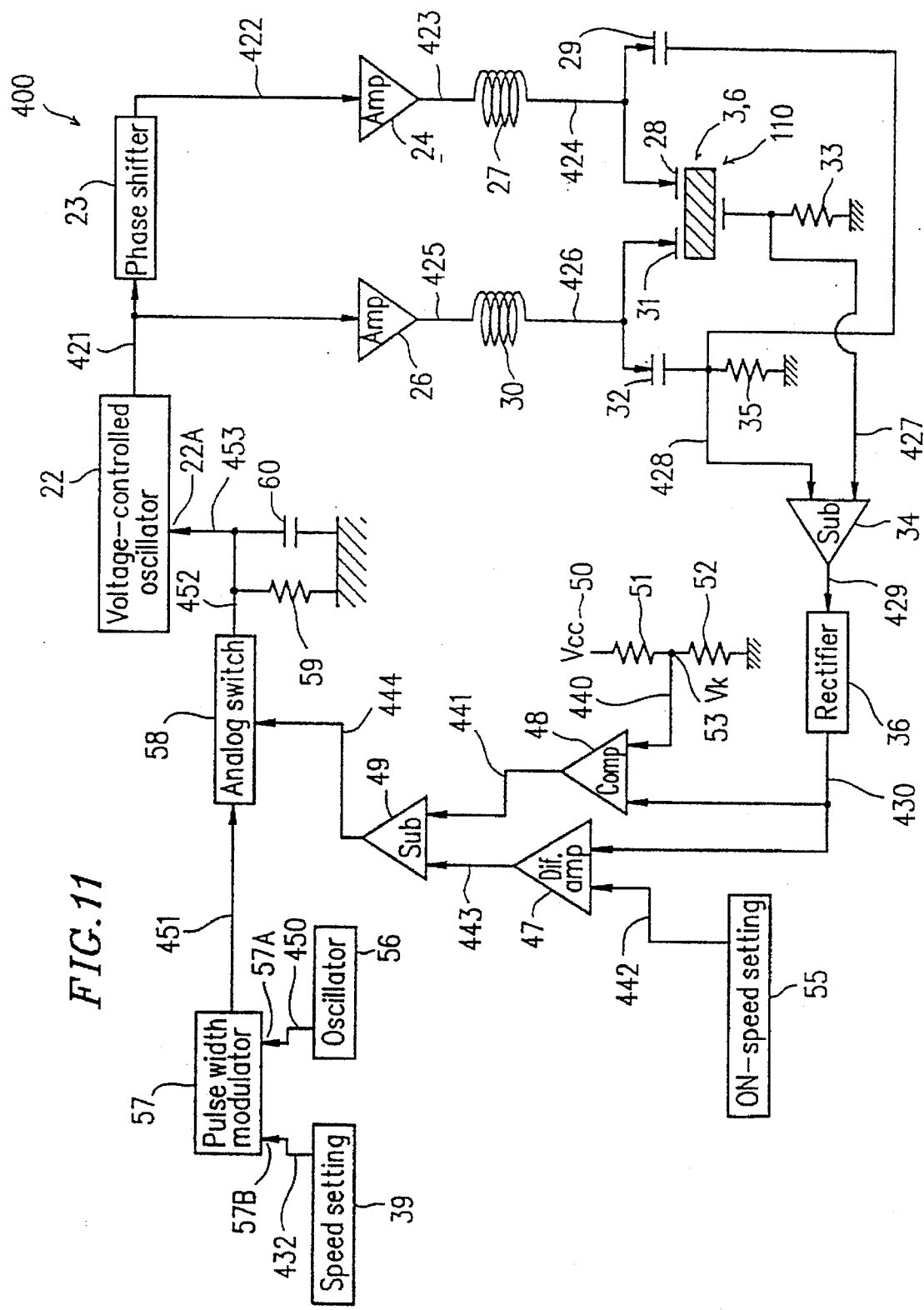
FIG. 11 is a block diagram of a driving circuit for an ultrasonic motor according to another embodiment of the present invention.

A third example of a method for driving an ultrasonic motor according to the present invention will be described. Referring to FIG. 11, a driving circuit 400 according to the present invention will be described for an ultrasonic motor 110 having the same structure as the ultrasonic motor 700 discussed above.

The present invention is also applicable to another type of the ultrasonic motor 110 such as a ring-shape ultrasonic motor or a ultrasonic motor using a standing wave as will be appreciated based on the disclosure herein.

FIG. 11 is a block diagram of a driving circuit 400 in another embodiment according to the present invention. As shown in FIG. 11, elements having the same structure as those of the driving circuit 300 discussed above are denoted by the same numerical references.

The driving circuit 400 is used for intermittent driving of the ultrasonic motor 110. In order to obtain a relatively low rotation speed of the ultrasonic motor 110, for example, less then 50 r.p.m., the ultrasonic motor is driven intermittently. The rotational power (torque) of the ultrasonic motor 110 which is driven by intermittent driving at a higher driving frequency is larger than that driven by continuous driving at a lower driving frequency, when the both driving realize the same rotational speed of the ultrasonic motor 110.

The driving circuit 400 comprises: a voltage-controlled oscillator 22; a phase shifter 23 connected to the output of the voltage-controlled oscillator 22; a power amplifier 24 connected to the output of the phase sifter 23; a power amplifier 26 connected to the output of the voltage-controlled oscillator 22; coils 27 and 30 connected to the output of the power amplifiers 24 and 26, respectively, the outputs of the coils 27 and 30 being connected to driving electrode sets 28 and 31 on the piezoelectric member 2 (see FIG. 16) of the ultrasonic motor 110, respectively; capacitors 29 and 32 connected to the coils 27 and 30 respectively; a resistance 35 connected to outputs of the capacitor 29 and 32, another terminal of the resistance 35 being grounded; a resistance 33 having the same resistance value as that of the resistance 35, connected to an output of the piezoelectric member 2 of the ultrasonic motor 110, another terminal of the resistance 33 being grounded; a subtracter 34 connected to the resistances 33 and 35; a rectifier 36 connected to the subtracter 34; a differential amplifier 47 connected to the output of the rectifier 36; a comparator 48 one input of which is connected to the output of the rectifier 36; resistances 51 and 52 coupled to the other input of the comparator 48, another terminal of the resistance 51 being connected to the power supply voltage ($V_{cc}$) 50, and another terminal of the resistance 52 being grounded, so that a divisional voltage ($V_k$) 53 is applied to the other input of the comparator 48; a subtracter 49 coupled to the respective outputs of the differential amplifier 47 and the comparator 48; an ON-speed setting unit 55 connected to one input of the differential amplifier 47, for setting a target rotation speed in a driving state of the ultrasonic motor 110; an analog switch 58 connected to the output of the subtracter 49; a pulse width modulator 57 connected to the input of the analog switch 58; an oscillator 56 connected to the clock input 57A of the pulse width modulator 57; a speed setting unit 39 connected to the control input 57B of the pulse width modulator 57; and a resistance 59 and a capacitor 60 coupled parallel to the output of the analog switch 58 and also coupled to the voltage control input 22A of the voltage-controlled oscillator 22, another terminal of the resistance 59 and another terminal of the capacitor 60 being grounded.

Operation of the driving circuit 400 according to the present invention will be now described.

The oscillator 56 oscillates with a frequency corresponding to a cycle of the intermittent driving of the ultrasonic motor 110, and input a resultant pulse signal 450 to the clock input 57A of the pulse width modulator 57. The pulse width modulator 57 modulates the pulse width of the pulse signal 450 based on the target speed signal 432 input to the control input 57B thereof from the speed setting unit 39. The output signal 451 of the pulse width modulator 57 is input to the analog switch 58 in order to control an ON-OFF interval of the analog switch 58. When the analog switch 58 in the ON-state, the ultrasonic motor 110 (the vibrator 3) is in a rotating (vibrating) state, and when the analog switch 58 in the OFF-state, the vibrator 3 of the ultrasonic motor 110 is in a stationary state. Thus, the intermittent driving of the ultrasonic motor 100 is performed, and the rotational speed is controlled by changing the ON-OFF interval of the analog switch.

At a rising edge of the pulse signal 451 output from the pulse width modulator 57, i.e. at starting of the rotation state of the ultrasonic motor 110 in the intermittent driving, the rotational speed signal 430, which is a feedback signal from the ultrasonic motor 110, is sufficiently lower than the voltage ($V_k$) 53 (see FIG. 6) when the ultrasonic motor 110 is in the stationary state. Thus, the output signal 441 of the comparator 48 goes high, resulting in a sufficiently low level of the output signal 444 of the subtracter 49.

The output signal 452 (i.e. the output signal 444 of the subtractor 49 through the analog switch 58) charges immediately the condenser 60 and the corresponding voltage signal 453 is applied to the input 22A of the voltage-controlled oscillator 22. Accordingly, at the starting of the rotation state, the driving frequency is sufficiently higher than the resonance frequency of the vibrator 3 in the stationary state, as described above in connection with FIG. 10.

By sweeping the driving frequency from a frequency sufficiently higher than the resonance frequency of the bivrator 3 in the stationary state, the ultrasonic motor 110 can be started and driven efficiently and stably, as discussed above in relation to FIGS. 21 and 22.

When the ultrasonic motor 110 comes into a regular driving state of the intermittent driving, the voltage-controlled oscillator 22 generates a pulse driving signal 421 which has a frequency corresponding to a given target speed for the driving state (ON-state) of the ultrasonic motor 110.

The pulse driving signal 421 output from the voltage-controlled oscillator 22 is divided into two signals. One signal is shifted in phase by a predetermined amount (by +90° or −90°) by a phase shifter 23 and a resultant phase shifted signal 422 is input to a power amplifier 24. The power amplifier 24 amplifies the signal 422 so that the resultant signal 423 has a level which is sufficiently high to drive the ultrasonic motor 110.

The other signal is directly input from the voltage-controlled oscillator 22 to the power amplifier 26. The power amplifier 26 amplifies the signal so that the resultant signal 425 has a level which is sufficiently high to drive the ultrasonic motor 110.

The waveform of the signal 423 output from the power amplifier 24 is shaped by the coil 27, and then the shaped signal 424 is coupled to one driving electrode set 28 on the piezoelectric member 2 (see FIG. 16). The signal 424 is also coupled to a capacitor 29 which has an equivalent capacitance of the piezoelectric member 2 under the electrode set 28. Similarly, the waveform of the amplified signal 425 from the power amplifier 26 is shaped by the coil 30, and then the shaped signal 426 is coupled to the other driving electrode set 31 on the piezoelectric member. The signal 426 is also coupled to the capacitor 32 which has an equivalent capacitance of the piezoelectric member under the electrode set 31.

By applying the pair of the signals 424 and 426 to the electrode sets 28 and 31, respectively, a traveling wave of a flexural vibration is excited on the vibrator 3. The rotor 6 is rotated in the opposite direction of the flexural traveling wave, as mentioned above, so that the ultrasonic motor 110 is driven. In the piezoelectric member, a total current i flows, which depends on the frequency and the magnitude of a voltage signal applied to the piezoelectric member according to the signals 424 and 426. The total current i is linearly converted into a voltage signal 427 by the resistance 33 coupled to ground. The voltage signal 427 is then applied to one input of the subtracter 34.

Electric currents $i_e'$ equivalent to the electric branch current $i_e$ which flows in the electrode sets 28 and 31 depending on the frequency and the absolute value of the amplitude of the voltage signal applied to the piezoelectric member 2, are input to capacitors 29 and 32. These currents are applied together to the resistance 35 so as to be converted linearly into a voltage signal 428. The signal 428 is applied to another input of the subtracter 34.

The output of the subtracter 34 is a voltage signal 429 which has a differential value obtained by subtracting the voltage signal 428 (the total current i) from the voltage signal 427 (the electric branch current $i_e$). Therefore, the voltage signal 329 is proportional to the mechanical branch current $e_m$ (shown in FIG. 19). The mechanical branch current $e_m$ is proportional to the vibration velocity of the vibrator 3, so as to be proportional to the rotational speed of the rotor 6, as discussed above. Thus, the voltage signal 429 is proportional to the rotational speed of the rotor 6 and used for indicating the rotational speed of the rotor 6.

The output signal 429 from the subtracter 34 is converted into a DC voltage signal 430 by the rectifier 36. The signal 430 is a rotational speed signal S which indicates the rotational speed obtained from the mechanical branch current $e_m$. The signal 430 is divided into two, one of which is coupled to the one input of the differential amplifier 47, and the other of which is coupled to one input of the comparator 48.

The differential amplifier 47 compares the value of the signal 430 (the rotational speed signal S) with the ON-state target speed signal 442 input from the ON speed setting unit 55, and generates an error signal 443. The error signal 443 represents the difference between the target rotational speed in the ON-state given by the ON-speed setting unit 55 and the current rotational speed of the ultrasonic motor 110 which is indicated by the rotational speed signal 430. The error signal 443 is input to the one input of the subtracter 49.

The comparator 48 compares the rotational speed signal 430 which is input to one input with a signal 440 which is input to the other input. The signal corresponds to the divisional voltage ($V_k$) 53 which is obtained by dividing the power supply voltage ($V_{cc}$) 50 with the resistances 51 and 52.

As shown in FIG. 6, when the ultrasonic motor 110 is driven in the driving range 74, the rotational speed signal 430 is larger than the voltage ($V_k$) 53. Therefore, the output signal 441 of the comparator 48 remains low, resulting in that the subtracter 49 keeps the output signal 444 at a level equivalent to the signal 443. The output signal 444 from the subtracter 49 is applied to the voltage-controlled oscillator 22 via the analog switch 58, as described above. Accordingly, the ultrasonic motor 110 is kept driving at the rotational speed corresponding to the ON-state target speed given by the ON-speed setting unit 55.

When the ultrasonic motor 110 having been in the driving state comes into the stationary state of the intermittent driving, the pulse signal 451 output from the pulse width modulator 57 goes low. Accordingly, the analog switch 58 comes into the OFF-state, so that electric charge supply to the resistance 59 and the condenser 60 is stopped. The voltage level of the signal 453 which is applied to the voltage control input 22A of the voltage-controlled oscillator 22 is decreased in accordance with a time constant of electric discharge which is determined by the resistance value of the resistance 49 and the capacitance of the condenser 60.

Figure 21:
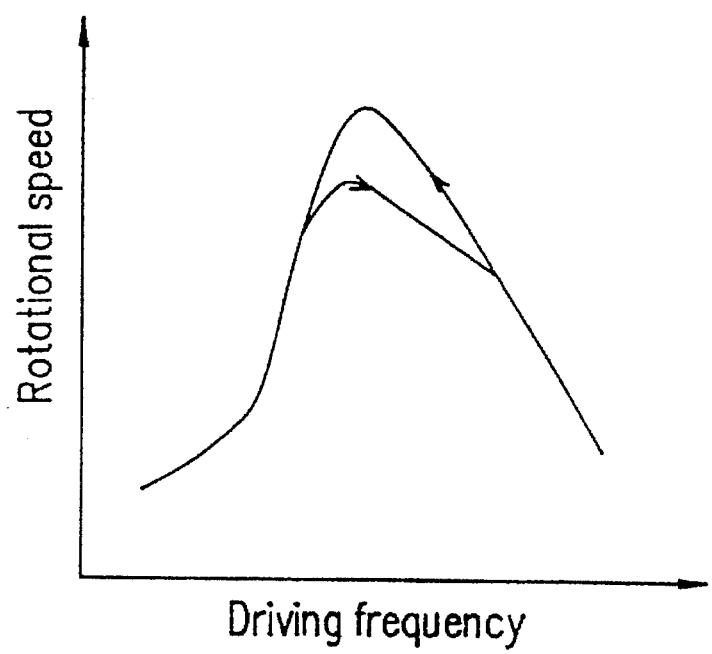
FIG. 21 is a block diagram of another conventional driving and velocity controlling circuit for the ultrasonic motor.
Figure 22:
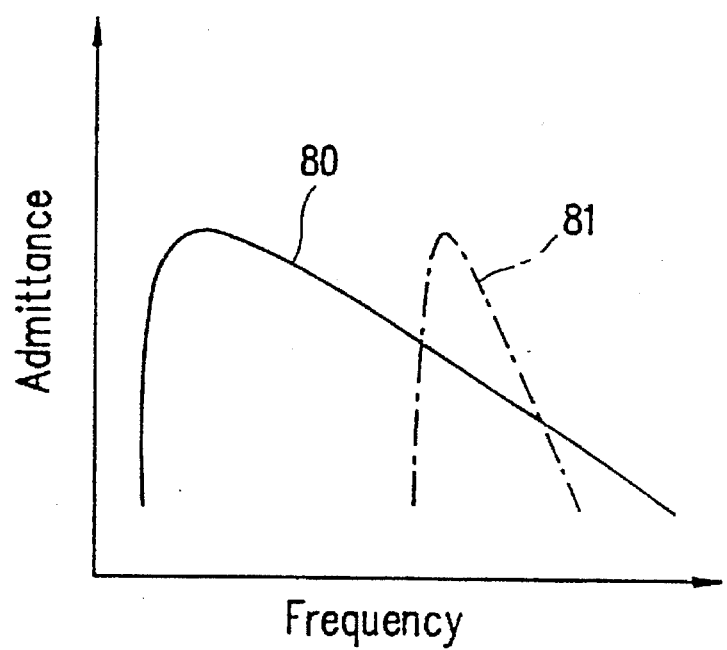
FIG. 22 is a graph illustrating the relationship between the admittance of the vibrator and the driving frequency when the vibrator is in the driving state and in the stationary state.

As shown in FIG. 10, as the voltage applied to the control input 22A of the voltage controlled oscillator 22 is decreased gradually, the oscillation frequency of the voltage controlled oscillator 22 increases gradually according to the decrease of the applied voltage. Therefore, as shown in FIG. 21, the rotation speed of the ultrasonic motor 110 is decreased gradually to stop by the time constant of the electric discharge.

As is described above, when the ultrasonic motor 110 is stopped in the intermittent driving, the rotational speed is decreased gradually to stop, so that the rotor 6 is also stopped gradually. This prevents a slip between the vibrator 3 and the rotor 6 due to inertia of the rotor 6 itself, the transmission axis 7, an external load, and the like. Thus, according to the present invention, it is possible to minimize audible noise and undesirable vibration in the intermittent driving of the ultrasonic motor 110, resulting in a silent ultrasonic motor 110.

By starting the ultrasonic motor 100 by sweeping the driving frequency from a frequency which is sufficiently higher than the resonance frequency of the vibrator 3 in the stationary state at the start of the rotation state (ON-state) of the intermittent driving, the ultrasonic motor 110 is driven efficiently and stably.

By stopping the ultrasonic motor 100 by sweeping the driving frequency toward higher frequency so as to gradually decreasing the rotation speed of the rotor 6 to stop, audible noise and undesirable vibration in the intermittent driving of the ultrasonic motor 110 can be minimized, resulting in a silent, efficient, and stable driving of the ultrasonic motor 110.

The ON state period and the OFF-state period of the ultrasonic motor 110 can be controlled to prevent undesirable noise and vibration.

In this example, the driving frequency is increased in order to decrease gradually the rotation speed of the ultrasonic motor 110 when the ultrasonic motor 110 is stopped during intermittent driving. Gradual decrease of the magnitude of the driving voltage signal or gradual shift of the phase difference of the driving voltage signal from 90° may be used for gradual decrease of the rotation speed of the ultrasonic motor 110.

EXAMPLE 4

Figure 12:
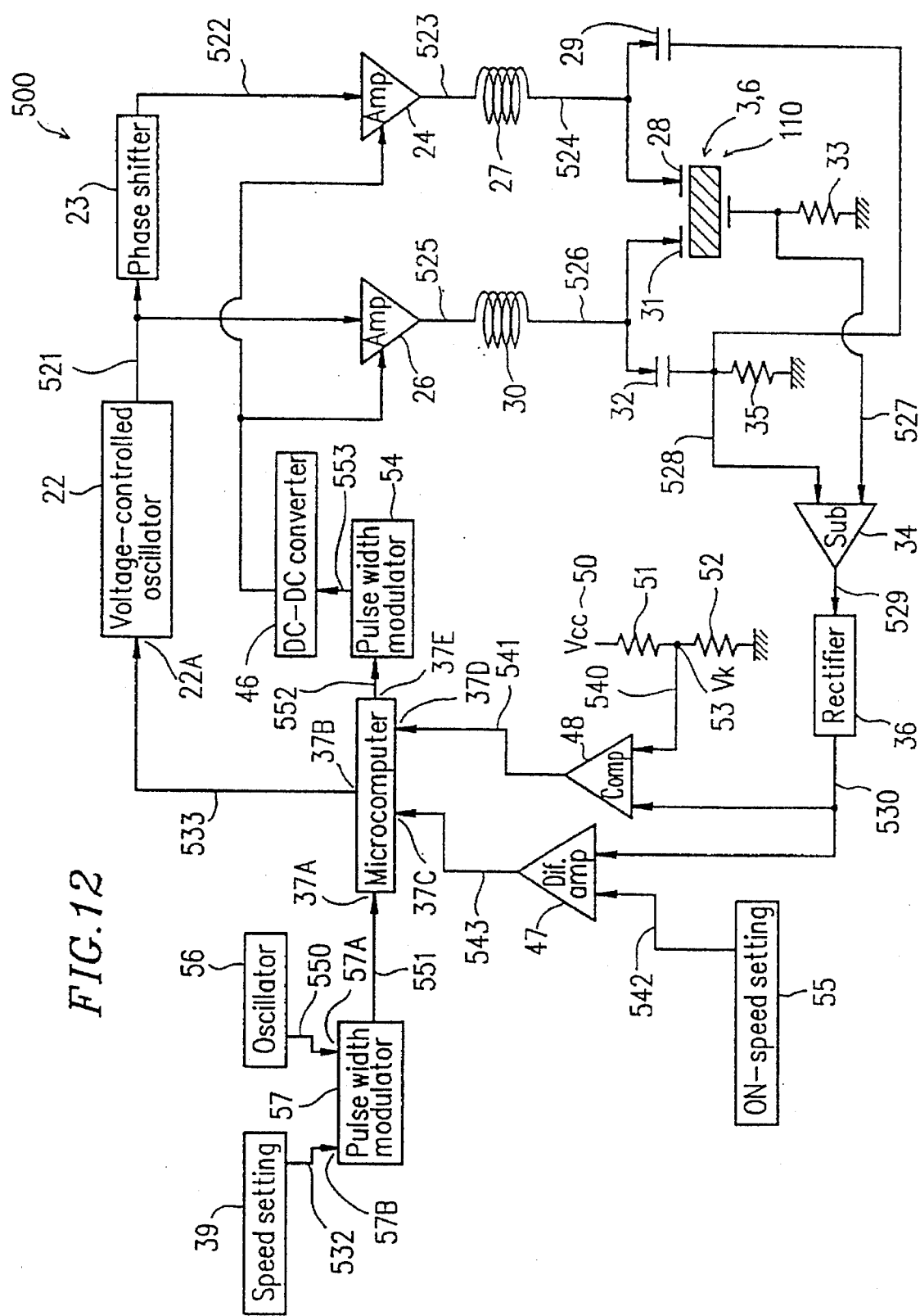
FIG. 12 is a block diagram of a driving circuit for an ultrasonic motor according to another embodiment of the present invention.

A fourth example of a method for driving an ultrasonic motor according to the present invention will be described. Referring to FIG. 12, a driving circuit 500 according to the present invention will be described for an ultrasonic motor 110 having the same structure as the ultrasonic motor 700 discussed above.

The present invention is also applicable to another type of the ultrasonic motor 110 such as a ring-shape ultrasonic motor or a ultrasonic motor using a standing wave as will be appreciated based on the disclosure herein.

FIG. 12 is a block diagram of a driving circuit 500 in another embodiment according to the present invention. As shown in FIG. 12, elements having the same structure as those of the driving circuits 200 to 400 discussed above are denoted by the same numerical references.

The driving circuit 500 is used for intermittent driving of the ultrasonic motor 110. In this example, the magnitude of the driving voltage signal is gradually decreased in order to decrease gradually the rotation speed of the ultrasonic motor 110 when the ultrasonic motor 110 is stopped during intermittent driving.

The driving circuit 500 comprises: a voltage-controlled oscillator 22; a phase shifter 23 connected to the output of the voltage-controlled oscillator 22; a power amplifier 24 connected to the output of the phase sifter 23; a power amplifier 26 connected to the output of the voltage-controlled oscillator 22; coils 27 and 30 connected to the output of the power amplifiers 24 and 26, respectively, the outputs of the coils 27 and 30 being connected to driving electrode sets 28 and 31 on the piezoelectric member 2 (see FIG. 16) of the ultrasonic motor 110, respectively; capacitors 29 and 32 connected to the coils 27 and 30, respectively; a resistance 35 connected to outputs of the capacitor 29 and 32, another terminal of the resistance 35 being grounded; a resistance 33 having the same resistance value as that of the resistance 35, connected to an output of the piezo electric member 2 of the ultrasonic motor 110, another terminal of the resistance 33 being grounded; a subtracter 34 connected to the resistances 33 and 35; a rectifier 36 connected to the subtracter 34; a differential amplifier 47 connected to the output of the rectifier 36; a comparator 48 one input of which is connected to the output of the rectifier 36; resistances 51 and 52 coupled to the other input of the comparator 48, another terminal of the resistance 51 being connected to the power supply voltage ($V_{cc}$) 50, and another terminal of the resistance 52 being grounded, so that a divisional voltage ($V_k$) 53 is applied to the other input of the comparator 48; an ON-speed setting unit 55 connected to one input of the differential amplifier 47, for setting a target rotation speed in a driving state of the ultrasonic motor 110; a microcomputer 37 coupled to the respective outputs of the differential amplifier 47 and the comparator 48, the analog output 37B thereof being connected to the frequency control input 22A of the voltage-controlled oscillator 22; a pulse width modulator 57 connected to the digital input 37A of the microcomputer 37; an oscillator 56 connected to the clock input 57A of the pulse width modulator 57; a speed setting unit 39 connected to the pulse width control input 57B of the pulse width modulator 57; a pulse width modulator 54 connected to the analog output 37E of the microcomputer 37; and a DC-DC convertor 46 connected to the output of the pulse width modulator 54, and coupled to the power supply input 24A of the power amplifiers 24 and the power supply input 26A of the power amplifier 26.

Operation of the driving circuit 500 according to the present invention will be now described.

The oscillator 56 oscillates with a frequency corresponding to a cycle of the intermittent driving of the ultrasonic motor 110, and input a resultant pulse signal 550 to the clock input 57A of the pulse width modulator 57. The pulse width modulator 57 modulates the pulse width of the pulse signal 550 based on the voltage level of the target speed signal 532 input to the control input 57B thereof from the speed setting unit 39. The pulse width modulator 57 modulates the ON-period of the pulse signal 550 so as to control apparent rotational speed of the ultrasonic motor 110.

In the intermittent driving of the ultrasonic motor 110, the ultrasonic motor 110 rotates at a predetermined rational speed (i.e. in a rotation state) when the pulse signal 551 output from the pulse width modulator 57 goes high, and the ultrasonic motor 110 stop rotating (i.e. in a stationary state) when the pulse signal 551 output from the pulse width modulator 57 goes low.

At a rising edge of the pulse signal 551 output from the pulse width modulator 57, i.e. at starting of the rotation state of the ultrasonic motor 110 in the intermittent driving, the rotational speed signal 530, which is a feedback signal from the ultrasonic motor 110, is sufficiently lower than the voltage ($V_k$) 53 (see FIG. 6) when the ultrasonic motor 110 is in the stationary state. Thus, the output signal 541 of the comparator 48 goes high.

The output signal 541 is input to the digital input 37D of the microcomputer 37. The microcomputer 37 recognizes that the ultrasonic motor 110 is in the stationary state based on the signal 541, and generates a voltage signal 533 having a low level which corresponds to a high oscillation frequency of the voltage-controlled oscillator 22, the oscillation frequency being sufficiently higher than the resonance frequency of the vibrator 3.

The voltage signal 533 is output from the analog output 37B of the microcomputer 37 and input to the input 22A of the voltage-controlled oscillator 22.

The microcomputer 37 generates a control signal 552 for controlling the pulse width modulator 54. The control signal 552 is output from the analog output 37E of the microcomputer 37 and input to the pulse width modulator 54. The pulse width modulator 54 modulates the pulse width of the pulse signal 553 based on the control signal 552, and input the pulse signal 553 to the DC-DC convertor 46. The DC-DC convertor 46 supplies power for driving the ultrasonic motor 110 to the power amplifiers 24 and 25, based on the input pulse signal 553.

Accordingly, at the starting of the rotation state, the driving frequency is sufficiently higher than the resonance frequency of the vibrator 3 in the stationary state, as described above in connection with FIG. 10.

By sweeping the diving frequency from a frequency sufficiently higher than the resonance frequency of the vibrator 3 in the stationary state, the ultrasonic motor 110 can be started and driven efficiently and stably (see FIG. 21).

When the ultrasonic motor 110 comes into a regular driving state of the intermittent driving, the microcomputer 37 adjust the control signal 533 based on a rotational speed error signal 543 which is input to the analog input 37C thereof from the differential amplifier 47. The control signal 533 is adjusted so that the rotational speed of the ultrasonic motor 110 is to be an ON state target speed. The microcomputer 37 outputs the control signal 533 from the analog output 37B thereof and inputs it to the input 22A of the voltage-controlled oscillator 22.

The voltage-controlled oscillator 22 generates a pulse driving signal 521 which has a frequency corresponding to the value of the control signal 533.

The pulse driving signal 521 output from the voltage-controlled oscillator 22 is divided into two signals. One signal is shifted in phase by a predetermined amount (by +90° or −90°) by a phase shifter 23 and a resultant phase shifted signal 522 is input to a power amplifier 24. The power amplifier 24 amplifies the signal 522 so that the resultant signal 523 has a level which is sufficiently high to drive the ultrasonic motor 110.

The other signal is directly input from the voltage-controlled oscillator 22 to the power amplifier 26. The power amplifier 26 amplifies the signal so that the resultant signal 525 has a level which is sufficiently high to drive the ultrasonic motor 110.

The waveform of the signal 523 output from the power amplifier 24 is shaped by the coil 27, and then the shaped signal 524 is coupled to one driving electrode set 28 on the piezoelectric member 2 (see FIG. 16). The signal 524 is also coupled to a capacitor 29 which has an equivalent capacitance of the piezoelectric member 2 under the electrode set 28. Similarly, the waveform of the amplified signal 525 output from the power amplifier 26 is shaped by the coil 30, and then the shaped signal 526 is coupled to the other driving electrode set 31 on the piezoelectric member. The signal 526 is also coupled to the capacitor 32 which has an equivalent capacitance of the piezoelectric member under the electrode set 31.

By applying the pair of the signals 524 and 526 to the electrode sets 28 and 31, respectively, a traveling wave of a flexural vibration is excited on the vibrator 3. The rotor 6 is rotated in the opposite direction of the flexural traveling wave, as mentioned above, so that the ultrasonic motor 110 is driven. In the piezoelectric member, a total current i flows, which depends on the frequency and the magnitude of a voltage signal applied to the piezoelectric member according to the signals 524 and 526. The total current i is linearly converted into a voltage signal 527 by the resistance 33 coupled to ground. The voltage signal 527 is then applied to one input of the subtracter 34.

Electric currents $i_e'$ equivalent to the electric branch current $i_e$ which flows in the electrode sets 28 and 31 depending on the frequency and the absolute value of the amplitude of the voltage signal applied to the piezoelectric member 2, are input to capacitors 29 and 32. These currents are applied together to the resistance 35 so as to be converted linearly into a voltage signal 528. The signal 528 is applied to another input of the subtracter 34.

The output of the subtracter 34 is a voltage signal 529 which has a differential value obtained by subtracting the voltage signal 528 (the total current i) from the voltage signal 527 (the electric branch current $i_e$). Therefore, the voltage signal 529 is proportional to the mechanical branch current $e_m$ (shown in FIG. 19). The mechanical branch current $e_m$ is proportional to the vibration velocity of the vibrator 3, so as to be proportional to the rotational speed of the rotor 6, as discussed above. Thus, the voltage signal 529 is proportional to the rotational speed of the rotor 6 and used for indicating the rotational speed of the rotor 6.

The output signal 529 from the subtracter 34 is converted into a DC voltage signal 530 by the rectifier 36. The signal 530 is a rotational speed signal S which indicates the rotational speed obtained from the mechanical branch current $e_m$. The signal 530 is divided into two, one of which is coupled to the one input of the differential amplifier 47, and the other of which is coupled to one input of the comparator 48.

The differential amplifier 47 compares the value of the signal 530 (the rotational speed signal S) with the ON-state target speed signal 542 input from the ON-speed setting unit 55, and generates the rotational speed error signal 543. The rotational speed error signal 543 represents the difference between the target rotational speed in the ON-state given by the ON-speed setting unit 55 and the current rotational speed of the ultrasonic motor 110 which is indicated by the rotational speed signal 530. The error signal 543 is input to the analog input 37C of the microcomputer 37.

The comparator 48 compares the rotational speed signal 530 which is input to one input with a signal 540 which is input to the other input. The signal corresponds to the divisional voltage $(V_k)$ 53 which is obtained by dividing the power supply voltage $(V_{cc})$ 50 with the resistances 51 and 52.

As shown in FIG. 6, when the ultrasonic motor 110 is driven in the driving range 74, the rotational speed signal 530 is larger than the voltage $(V_k)$ 53. Therefore, the output signal 541 of the comparator 48 remains low. The signal 541 is input to the digital input 37D of the microcomputer 37.

The microcomputer 37 recognizes that the ultrasonic motor 110 is in the rotation state based on the signal 541 at the low level, and adjusts the voltage signal 533 based on the rotational speed error signal 543 so as to keep the rotational speed at the On-state target speed given by the ON-speed setting unit 55.

When the ultrasonic motor 110 is in the stationary state, the rotational speed signal 530 is lower than the voltage $(V_k)$ 53. Therefore, the output signal 541 of the comparator 48 is high. The signal 541 having the high level is input to the digital input 37D of the microcomputer 37.

The microcomputer 37 recognizes that the ultrasonic motor 110 is in the stationary state based on the signal 541 at the high level, and adjusts the voltage signal 533 to have the low level which corresponds to a oscillation frequency of the voltage-controlled oscillator 22 which is sufficiently higher than the resonance frequency of the vibrator 3. Accordingly, the ultrasonic motor 110 is started again and moved to the regular driving state at the rotational speed corresponding to the ON-state target speed given by the ON-speed setting unit 55.

When the ultrasonic motor 110 which has been in the driving state comes into the stationary state of the intermittent driving, the pulse signal 551 output from the pulse width modulator 57 goes low. When the pulse signal 551 at the low level is input to the digital input 37A of the microcomputer 37, the microcomputer 37 cuts off a control operation routine and holds the voltage level of the output signal 533. Accordingly, the voltage-controlled oscillator 22 maintains oscillating at a constant oscillation frequency.

At the same time, the microcomputer 37 changes the control signal 552 output from the analog output 37E in order to control the pulse width modulator 54, so that the pulse width modulator 54 decreases gradually the duty ratio of the output signal 553. The signal 553 is input to the DC-DC converter 46. Controlled by the signal 553 of which duty ratio decreases gradually, the DC-DC converter 46 lowers the level of power supply which is supplied to the power amplifier 24 and 26. Accordingly, the magnitude of the driving voltage which is applied to the ultrasonic motor 110 is decreased gradually, the frequency of the driving voltage remaining constant.

Figure 13:
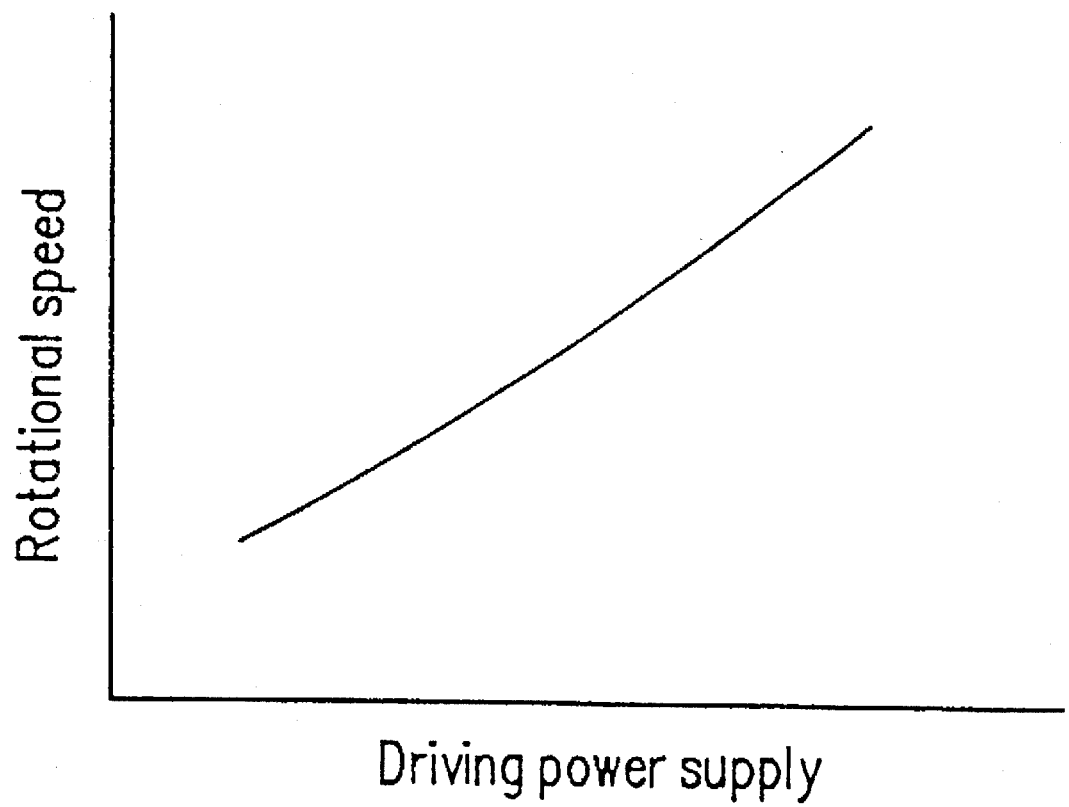
FIG. 13 is a graph illustrating the relationship between the rotational speed and the power supply (driving voltage).

FIG. 13 shows the relationship between the driving voltage level (power supply) and the rotational speed of the ultrasonic motor 110 under the constant driving frequency. As shown in FIG. 13, as the magnitude of the driving voltage decreases, the rotational speed also decrease, so as to realize the gradual stop of the ultrasonic motor 110.

As described above, in the intermittent driving, by decreasing gradually the rotational speed of the rotor 6, it is possible to prevent a slip between the vibrator 3 and the rotor 6 due to inertia of the rotor 6 itself, the transmission axis 7, an external load, and the like.

By starting and stopping the ultrasonic motor 110 using the above described driving method according to the present invention, it is possible to start and drive the ultrasonic motor 110 stably, and to minimize audible noise and undesirable vibration in the intermittent driving of the ultrasonic motor 110.

As described above, by starting the ultrasonic motor 100 by sweeping the driving frequency from a frequency which is sufficiently higher than the resonance frequency of the vibrator 3 in the stationary state at the start of the rotation state (ON-state) of the intermittent driving, the ultrasonic motor 110 is driven efficiently and stably.

By stopping the ultrasonic motor 100 by sweeping the driving frequency toward higher frequency so as to gradually decreasing the rotation speed of the rotor 6 to stop, audible noise and undesirable vibration in the intermittent driving of the ultrasonic motor 110 can be minimized, resulting in a quiet, efficient, and stable driving of the ultrasonic motor 110.

The ON-state period and the OFF-state period of the ultrasonic motor 110 can be controlled to prevent undesirable noise and vibration.

In this example, the driving voltage is decreased and the driving frequency is kept constant, in order to decrease gradually the rotation speed of the ultrasonic motor 110 when the ultrasonic motor 110 is stopped during intermittent driving. Gradual increase of the driving frequency and gradual decrease of the magnitude of the driving voltage signal may be used for gradual decrease of the rotation speed of the ultrasonic motor 110.

EXAMPLE 5

Figure 14:
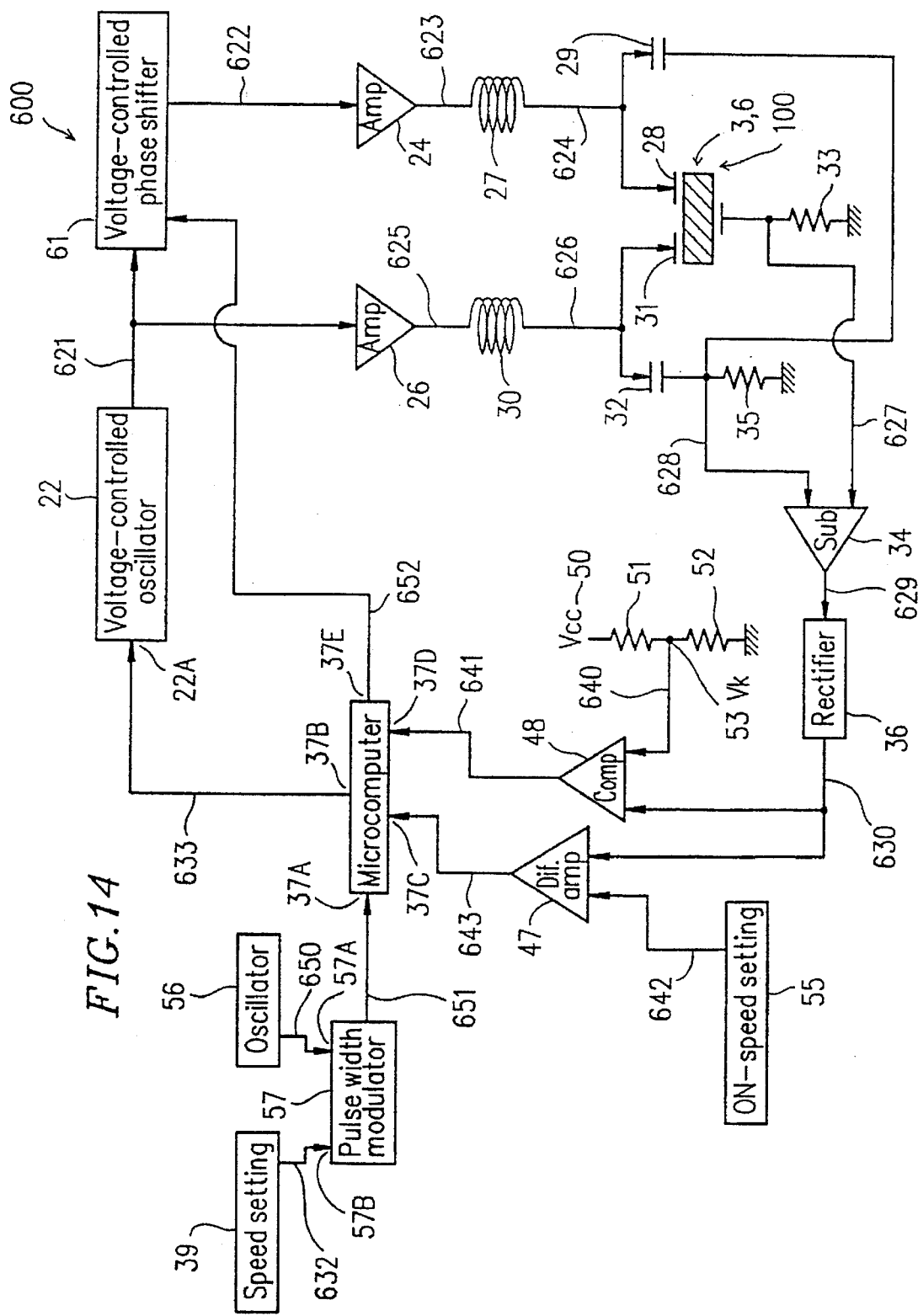
FIG. 14 is a block diagram of a driving circuit for an ultrasonic motor according to another embodiment of the present invention.

A fifth example of a method for driving an ultrasonic motor according to the present invention will be described. Referring to FIG. 14, a driving circuit 600 according to the present invention will be described for an ultrasonic motor 110 having the same structure as the ultrasonic motor 700 discussed above.

The present invention is also applicable to another type of the ultrasonic motor 110 such as a ring-shape ultrasonic motor or a ultrasonic motor using a standing wave as will be appreciated based on the disclosure herein.

FIG. 14 is a block diagram of a driving circuit 600 in another embodiment according to the present invention. As shown in FIG. 14, elements having the same structure as those of the driving circuits 200 to 500 discussed above are denoted by the same numerical references.

The driving circuit 600 is used for intermittent driving of the ultrasonic motor 110. In this example, the phase difference of the driving voltage signal is gradually shifted from the 90° in order to decrease gradually the rotation speed of the ultrasonic motor 110 when the ultrasonic motor 110 is stopped during intermittent driving.

The driving circuit 600 comprises: a voltage-controlled oscillator 22; a voltage-controlled phase shifter 61 connected to the output of the voltage-controlled oscillator 22; a power amplifier 24 connected to the output of the voltage-controlled phase sifter 61; a power amplifier 26 connected to the output of the voltage-controlled oscillator 22; coils 27 and 30 connected to the output of the power amplifiers 24 and 26, respectively, the outputs of the coils 27 and 30 being connected to driving electrode sets 28 and 31 on the piezoelectric member 2 (see FIG. 16) of the ultrasonic motor 110, respectively; capacitors 29 and 32 connected to the coils 27 and 30, respectively; a resistance 35 connected to outputs of the capacitor 29 and 32, another terminal of the resistance 35 being grounded; a resistance 33 having the same resistance value as that of the resistance 35, connected to an output of the piezoelectric member 2 of the ultrasonic motor 110, another terminal of the resistance 33 being grounded; a subtracter 34 connected to the resistances 33 and 35; a rectifier 36 connected to the subtracter 34; a differential amplifier 47 connected to the output of the rectifier 36; a comparator 48 one input of which is connected to the output of the rectifier 36; resistances 51 and 52 coupled to the other input of the comparator 48, another terminal of the resistance 51 being connected to the power supply voltage ($V_{cc}$) 50, and another terminal of the resistance 52 being grounded, so that a divisional voltage ($V_k$) 53 is applied to the other input of the comparator 48; an ON-speed setting unit 55 connected to one input of the differential amplifier 47, for setting a target rotation speed in a driving state of the ultrasonic motor 110; a microcomputer 37 coupled to the respective outputs of the differential amplifier 47 and the comparator 48, the analog output 37B thereof being connected to the frequency control input 22A of the voltage-controlled oscillator 22, the analog output 37E thereof being connected to the voltage-controlled phase shifter 61; a pulse width modulator 57 connected to the digital input 37A of the microcomputer 37; an oscillator 56 connected to the clock input 57A of the pulse width modulator 57; and a speed setting unit 39 connected to the pulse width control input 57B of the pulse width modulator 57.

Operation of the driving circuit 600 according to the present invention will be now described.

The oscillator 56 oscillates with a frequency corresponding to a cycle of the intermittent driving of the ultrasonic motor 110, and input a resultant pulse signal 650 to the clock input 57A of the pulse width modulator 57. The pulse width modulator 57 modulates the pulse width of the pulse signal 650 based on the voltage level of the target speed signal 632 which is input to the control input 57B thereof from the speed setting unit 39, so as to control apparent rotational speed of the ultrasonic motor 110.

At a rising edge of the pulse signal 651 output from the pulse width modulator 57, i.e. at starting of the rotation state of the ultrasonic motor 110 in the intermittent driving, the rotational speed signal 630, which is a feedback signal from the ultrasonic motor 110, is sufficiently lower than the voltage ($V_k$) 53 (see FIG. 6) when the ultrasonic motor 110 is in the stationary state. Thus, the output signal 641 of the comparator 48 goes high.

The output signal 641 is input to the digital input 37D of the microcomputer 37. The microcomputer 37 recognizes that the ultrasonic motor 110 is in the stationary state based on the signal 641, and generates a voltage signal 633 having a low level which corresponds to a high oscillation frequency of the voltage-controlled oscillator 22, the oscillation frequency being sufficiently higher than the resonance frequency of the vibrator 3.

The voltage signal 633 which is output from the analog output 37B of the microcomputer 37 is input to the input 22A of the voltage-controlled oscillator 22.

By sweeping the diving frequency from a frequency sufficiently higher than the resonance frequency of the bivrator 3 in the stationary state, the ultrasonic motor 110 can be started and driven efficiently and stably (see FIG. 21).

When the ultrasonic motor 110 comes into a regular driving state of the intermittent driving, the voltage-controlled oscillator 22 generates a pulse driving signal 621 which has a frequency corresponding to a given target speed for the driving state (ON-state) of the ultrasonic motor 110, the frequency being controlled by the value of the control signal 633.

Accordingly, at the starting of the rotation state, the driving frequency is sufficiently higher than the resonance frequency of the vibrator 3 in the stationary state, as described above in connection with FIG. 10.

The pulse driving signal 621 output from the voltage-controlled oscillator 22 is divided into two signals. One signal is shifted in phase by a predetermined amount by the voltage-controlled phase shifter 61. At the starting of the ultrasonic motor 110, the microcomputer 37 output the control signal 652 having a voltage level which controls the voltage-controlled phase shifter 61 to set the phase shift amount at +90° (or −90° in a case where the ultrasonic motor 110 is rotated in the opposite direction).

The resultant phase shifted signal 622 is input to a power amplifier 24. The power amplifier 24 amplifies the signal 622 so that the resultant signal 623 has a level which is sufficiently high to drive the ultrasonic motor 110.

The other of the signal 621 is directly input from the voltage-controlled oscillator 22 to the power amplifier 26. The power amplifier 26 amplifies the signal so that the resultant signal 625 has a level which is sufficiently high to drive the ultrasonic motor 110.

The waveform of the signal 623 output from the power amplifier 24 is shaped by the coil 27, and then the shaped signal 624 is coupled to one driving electrode set 28 on the piezoelectric member 2 (see FIG. 16). The signal 624 is also coupled to a capacitor 29 which has an equivalent capacitance of the piezoelectric member 2 under the electrode set 28. Similarly, the waveform of the amplified signal 625 output from the power amplifier 26 is shaped by the coil 30, and then the shaped signal 626 is coupled to the other driving electrode set 31 on the piezoelectric member. The signal 626 is also coupled to the capacitor 32 which has an equivalent capacitance of the piezoelectric member under the electrode set 31.

By applying the pair of the signals 624 and 626 to the electrode sets 28 and 31, respectively, a traveling wave of a flexural vibration is excited on the vibrator 3. The rotor 6 is rotated in the opposite direction of the flexural traveling wave, as mentioned above, so that the ultrasonic motor 110 is driven. In the piezoelectric member, a total current i flows, which depends on the frequency and the magnitude of a voltage signal applied to the piezoelectric member according to the signals 624 and 626. The total current i is linearly converted into a voltage signal 627 by the resistance 33 coupled to ground. The voltage signal 627 is then applied to one input of the subtractor 34.

Electric currents $i_e$ equivalent to the electric branch current $i_e$ which flows in the electrode sets 28 and 31 depending on the frequency and the absolute value of the amplitude of the voltage signal applied to the piezoelectric member 2, are input to capacitors 29 and 32. These currents are applied together to the resistance 35 so as to be converted linearly into a voltage signal 628. The signal 628 is applied to another input of the subtractor 34.

The output of the subtractor 34 is a voltage signal 629 which has a differential value obtained by substracting the voltage signal 628 (the total current i) from the voltage signal 627 (the electric branch current $i_e$). Therefore, the voltage signal 629 is proportional to the mechanical branch current $e_m$ (shown in FIG. 19) The mechanical branch current $e_m$ is proportional to the vibration velocity of the vibrator 3, so as to be proportional to the rotational speed of the rotor 6, as discussed above. Thus, the voltage signal 629 is proportional to the rotational speed of the rotor 6 and used for indicating the rotational speed of the rotor 6.

The output signal 629 from the subtractor 34 is converted into a DC voltage signal 630 by the rectifier 36. The signal 630 is a rotational speed signal S which indicates the rotational speed obtained from the mechanical branch current $e_m$. The signal 630 is divided into two, one of which is coupled to the one input of the differential amplifier 47, and the other of which is coupled to one input of the comparator 48.

The differential amplifier 47 compares the value of the signal 630 (the rotational speed signal S) with the ON-state target speed signal 642 input from the ON-speed setting unit 55, and generates the rotational speed error signal 643. The rotational speed error signal 643 represents the difference between the target rotational speed in the ON-state given by the ON-speed setting unit 55 and the current rotational speed of the ultrasonic motor 110 which is indicated by the rotational speed signal 630. The error signal 643 is input to the analog input 37C of the microcomputer 37.

The comparator 48 compares the rotational speed signal 630 which is input to one input with a signal 640 which is input to the other input. The signal corresponds to the divisional voltage ($V_k$) 53 which is obtained by dividing the power supply voltage ($V_{cc}$) 50 with the resistances 51 and 52.

As shown in FIG. 6, when the ultrasonic motor 110 is driven in the driving range 74, the rotational speed signal 530 is larger than the voltage ($V_k$) 53. Therefore, the output signal 541 of the comparator 48 remains low. The signal 541 is input to the digital input 37D of the microcomputer 37.

The microcomputer 37 recognizes that the ultrasonic motor 110 is in the rotation state based on the signal 641 at the low level, and adjusts the voltage signal 633 based on the rotational speed error signal 643 so as to keep the rotational speed at the ON-state target speed given by the ON-speed setting unit 55.

When the ultrasonic motor 110 is in the stationary state, the rotational speed signal 630 is lower than the voltage ($V_k$) 53. Therefore, the output signal 641 of the comparator 48 is high. The signal 641 having the high level is input to the digital input 37D of the microcomputer 37.

The microcomputer 37 recognizes that the ultrasonic motor 110 is in the stationary state based on the signal 641 at the high level, and adjusts the voltage signal 633 to have the low level which corresponds to a oscillation frequency of the voltage-controlled oscillator 22 which is sufficiently higher than the resonance frequency of the vibrator 3. Accordingly, the ultrasonic motor 110 is started again and moved to the regular driving state at the rotational speed corresponding to the ON-state target speed given by the ON-speed setting unit 55.

When the ultrasonic motor 110 which has been in the driving state comes into the stationary state of the intermittent driving, the pulse signal 651 output from the pulse width modulator 57 goes low. When the pulse signal 651 at the low level is input to the digital input 37A of the microcomputer 37, the microcomputer 37 cuts off a control operation routine and holds the voltage level of the output signal 633. Accordingly, the voltage-controlled oscillator 22 maintains oscillating at a constant oscillation frequency.

At the same time, the microcomputer 37 changes the control signal 652 output from the analog output 37E in order to control the voltage-controlled phase shifter 61, so that the voltage-controlled phase shifter 61 shifts gradually the phase of the output signal 622. Accordingly, the phase difference between the signal 624 and the signal 626 is gradually shifted from 90° toward 180° (or 0°).

Figure 15:
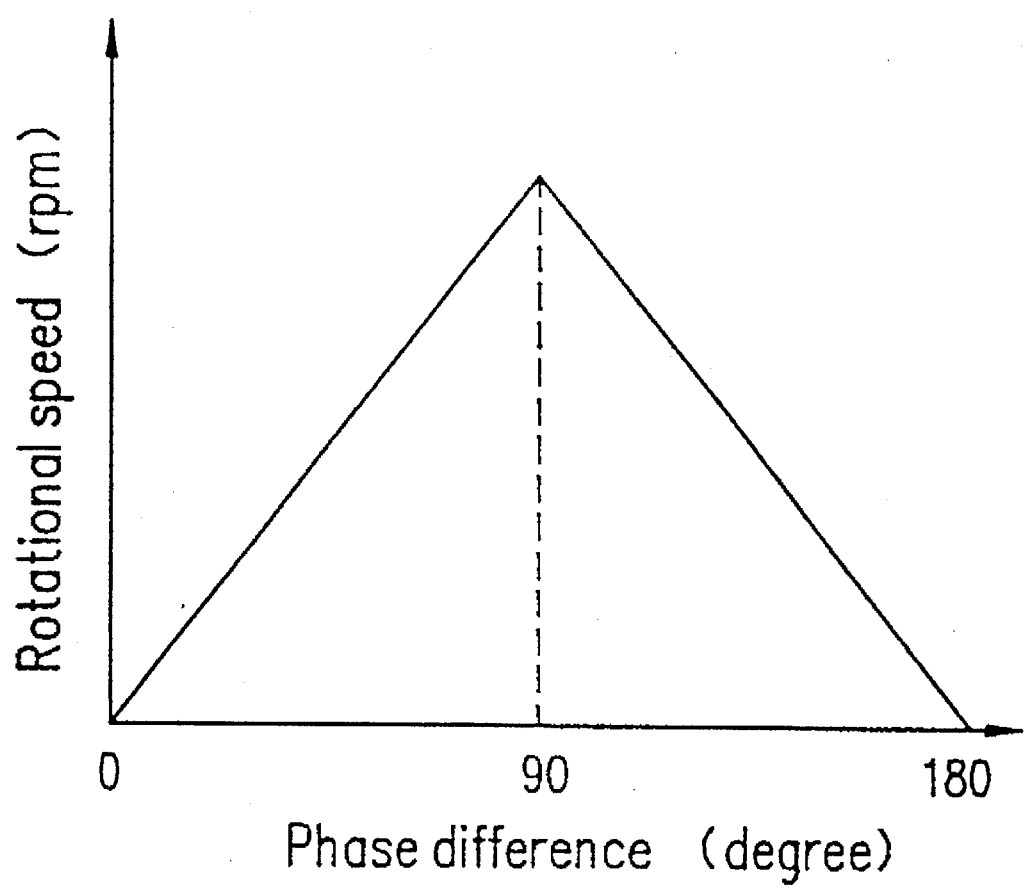
FIG. 15 is a graph illustrating the relationship between the rotational speed and the phase difference of the driving signal.

FIG. 15 shows the relationship between the phase difference between the pair of the driving signals and the rotational speed of the ultrasonic motor 110. As shown in FIG. 13, as the phase difference is leaving from 90°, the rotational speed decreases, so as to realize the gradual stop of the ultrasonic motor 110.

As described above, in the intermittent driving, by shifting the phase difference between the pair of the driving signals which applied to the driving electrode sets, the rotational speed of the rotor 6 is decreased gradually. This makes it possible to prevent a slip between the vibrator 3 and the rotor 6 due to inertia of the rotor 6 itself, the transmission axis 7, an external load, and the like.

By starting and stopping the ultrasonic motor 110 using the above described driving method according to the present invention, it is possible to start and drive the ultrasonic motor 110 stably, and to minimize audible noise and undesirable vibration in the intermittent driving of the ultrasonic motor 110.

As described above, by starting the ultrasonic motor 100 by sweeping the driving frequency from a frequency which is sufficiently higher than the resonance frequency of the vibrator 3 in the stationary state at the start of the rotation state (ON-state) of the intermittent driving, the ultrasonic motor 110 is driven efficiently and stably.

By stopping the ultrasonic motor 100 by shifting the phase difference between the pair of the driving signals so as to gradually decreasing the rotation speed of the rotor 6 to stop, audible noise and undesirable vibration in the intermittent driving of the ultrasonic motor 110 can be minimized, resulting in a quiet, efficient, and stable driving of the ultrasonic motor 110.

The ON-state period and the OFF-state period of the ultrasonic motor 110 can be controlled to prevent undesirable noise and vibration.

In this example, the phase difference between the pair of the driving signals is sifted gradually from 90°, and the frequency and the magnitude of the pair of the driving signals are kept constant, in order to decrease gradually the rotation speed of the ultrasonic motor 110 when the ultrasonic motor 110 is stopped during intermittent driving. Alternatively, both of phase difference shifting and gradual increase of the driving frequency, or both of phase difference shifting and gradual decrease of the magnitude of the pair of driving voltage signals may be used for gradual decrease of the rotation speed of the ultrasonic motor 110.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for driving an ultrasonic motor comprising a vibrator for causing a flexural vibration wave in response to a pair of AC driving voltage signals, and a rotor in contact with the vibrator and moved by the flexural vibration wave, a rotational speed of the ultra sonic motor being controlled by using a feedback signal and a data table, the feedback signal indicating the current rotational speed of the ultrasonic motor, the data table storing values of the feedback signal as a standard function of the rotational speed, the method including the steps of:

sampling the feedback signal and detecting the rotational speed in a plurality of rotation states of the ultrasonic motor;

obtaining an approximate function representing the relationship between the sampled feedback signal and the detected rotational speed;

calculating correction coefficients for adjusting the approximate function to the standard function; and controlling the rotational speed of the ultrasonic motor by using the feedback signal, wherein the controlling step includes a step of correcting the feedback signal obtained from the ultrasonic motor by using the correction coefficient to transform a value of the approximate function into a corresponding value of the standard function.

2. A method for driving an ultrasonic motor according to claim 1, wherein the standard function and the approximate function are linear functions, and the correction coefficients include a gradient correction coefficient and a shift correction coefficient.

3. A method for driving an ultrasonic motor according to claim 1, wherein the feedback signal is obtained from a current flowing in the vibrator, the current being proportional to a vibration velocity of the vibrator in a circumferential direction of the vibrator.

4. A method for driving an ultrasonic motor according to claim 1, wherein the feedback signal is obtained from a magnitude of vibration of the vibrator in a direction perpendicular to a face of the vibrator.

5. A method for driving an ultrasonic motor according to claim 1, wherein the feedback signal is obtained from a phase difference between the driving voltage signals and a current flowing in the vibrator, the current being proportional to a vibration velocity of the vibrator in a circumferential direction of the vibrator.

6. A method for driving an ultrasonic motor comprising a vibrator for causing a flexural vibration wave in response to a pair of AC driving voltage signals, and a rotor in contact with the vibrator and moved by the flexural vibration wave, the method comprising the steps of:

sweeping a driving frequency of the pair of AC driving voltage signals from a starting frequency higher than a resonance frequency of the vibrator in a stationary state when the ultrasonic motor is started driving;

supplying supply power to the ultrasonic motor, the supply power being initially a minimum supply power capable of realizing a predetermined maximum rotation speed of the ultrasonic motor under a standard load; and when the driving frequency exceeds a frequency which is capable of realizing a maximum rotational power of the ultrasonic motor by a current supply power, shifting the driving frequency higher than the resonance frequency of the vibrator in a stationary state, and increasing the supply power supplied to the ultrasonic motor in a stepwise manner.

7. A method for driving an ultrasonic motor according to claim 6, further comprising a step of decreasing gradually a rotational speed of the rotor when the rotor is stopped rotating.

8. A method for driving an ultrasonic motor according to claim 7, wherein the step of decreasing gradually the rotational speed of the rotor is performed when a driving state of the ultrasonic motor changes from a rotational state to a stationary state in intermittent driving of the ultrasonic motor.

9. A method for driving an ultrasonic motor according to claim 6, wherein the step of increasing the supply power is performed by increasing a duty ratio of a driving pulse signal for a step-up DC-DC converter.

10. A method for driving an ultrasonic motor according to claim 7, wherein the step of decreasing gradually the rotational speed of the rotor is performed by sweeping the driving frequency applied to the vibrator toward higher.

11. A method for driving an ultrasonic motor according to claim 7, wherein the step of decreasing gradually the rotational speed of the rotor is performed by stopping operation of a step-up DC-DC which supplies the supply power, and by decreasing gradually the driving voltage, the driving frequency remaining constant.

12. A method for driving an ultrasonic motor according to claim 7, wherein the step of decreasing gradually the rotational speed of the rotor is performed by shifting gradually a phase difference between the pair of AC driving voltage signals from 90°.

13. A driving circuit for an ultrasonic motor comprising a vibrator for causing a flexural vibration wave in response to a pair of AC driving voltage signals, and a rotor in contact with the vibrator and moved by the flexural vibration wave, the driving circuit including:

means for controlling a rotational speed of the ultrasonic motor by using a feedback signal and a data table, the feedback signal indicating the current rotational speed of the ultrasonic motor, the data table storing values of the feedback signal as a standard function of the rotational speed;

means for sampling the feedback signal and for detecting the rotational speed in a plurality of rotation states of the ultrasonic motor;

means for obtaining an approximate function representing the relationship between the sampled feedback signal and the detected rotational speed; and means for calculating correction coefficients for adjusting the approximate function to the standard function, wherein the controlling means comprises means for correcting the feedback signal obtained from the ultrasonic motor by using the correction coefficient to transform a value of the approximate function into a corresponding value of the standard function.

* * * * *